(12) United States Patent
Sato et al.

(10) Patent No.: US 7,038,699 B2
(45) Date of Patent: May 2, 2006

(54) IMAGE PROCESSING APPARATUS AND METHOD WITH SETTING OF PROHIBITED REGION AND GENERATION OF COMPUTER GRAPHICS DATA BASED ON PROHIBITED REGION AND FIRST OR SECOND POSITION/ORIENTATION

(75) Inventors: Hiroaki Sato, Tokyo (JP); Takashi Aso, Kanagawa (JP); Tomoaki Kawai, Kanagawa (JP); Yoshio Iizuka, Kanagawa (JP); Kenji Morita, Kanagawa (JP); Tomohiko Shimoyama, Tokyo (JP); Taichi Matsui, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 659 days.

(21) Appl. No.: 10/094,864

(22) Filed: Mar. 12, 2002

(65) Prior Publication Data
US 2002/0154070 A1   Oct. 24, 2002

(30) Foreign Application Priority Data
Mar. 13, 2001   (JP)   ............................. 2001-071116

(51) Int. Cl.
G09G 5/00   (2006.01)
G06T 15/10   (2006.01)
G06T 15/20   (2006.01)

(52) U.S. Cl. ..................... 345/633; 345/427; 345/629
(58) Field of Classification Search ................ 345/427, 345/419, 421, 629, 632–633
See application file for complete search history.

(56) References Cited

U.S. PATENT DOCUMENTS

| 5,321,767 A | * | 6/1994 | Murase ................. 382/149 |
| 5,751,959 A | | 5/1998 | Sato et al. ............... 395/200 |
| 5,815,411 A | | 9/1998 | Ellenby et al. ........... 364/559 |
| 6,002,995 A | | 12/1999 | Suzuki et al. ............ 702/188 |
| 6,020,891 A | * | 2/2000 | Rekimoto ................ 345/419 |
| 6,222,937 B1 | * | 4/2001 | Cohen et al. ............. 382/154 |
| 6,246,320 B1 | * | 6/2001 | Monroe .................. 340/506 |

(Continued)

FOREIGN PATENT DOCUMENTS

EP   0 899 690   3/1999

(Continued)

OTHER PUBLICATIONS

European Search Report dated Nov. 7, 2003 (Ref. No. DS/2810030).

*Primary Examiner*—Jeffery A. Brier
*Assistant Examiner*—Eric Woods
(74) *Attorney, Agent, or Firm*—Fitzpatrick, Cella, Harper & Scinto

(57) ABSTRACT

This invention has as its object to provide a high-quality composite image of a real image and virtual image to a viewer or the like. To achieve this object, the position/posture of photographing means for photographing a performer or the like is measured, the position/posture of an HMD, which the performer or the like wears, and which allows the viewer to see through the external world, is measured, a CG at the viewpoint of the photographing means and image data photographed by the photographing means are aligned and composited on the basis of the measurement result of the position/posture of the photographing means, CG at the viewpoint of the HMD and image data photographed by a camera built in the HMD are aligned and composited on the basis of the measurement result of the position/posture of the HMD, and image data is displayed on the HMD.

17 Claims, 34 Drawing Sheets

U.S. PATENT DOCUMENTS

| | | | |
|---|---|---|---|
| 6,266,068 B1 * | 7/2001 | Kang et al. | 345/629 |
| 6,278,461 B1 * | 8/2001 | Ellenby et al. | 345/427 |
| 6,522,312 B1 * | 2/2003 | Ohshima et al. | 345/8 |
| 6,624,853 B1 | 9/2003 | Latypov | 348/722 |
| 6,738,067 B1 * | 5/2004 | Hayama et al. | 345/474 |
| 2001/0033282 A1 * | 10/2001 | Hayama et al. | 345/423 |
| 2002/0036649 A1 * | 3/2002 | Kim et al. | 345/633 |
| 2002/0084974 A1 * | 7/2002 | Ohshima et al. | 345/156 |
| 2002/0158873 A1 * | 10/2002 | Williamson | 345/427 |
| 2002/0191862 A1 * | 12/2002 | Neumann et al. | 382/284 |
| 2003/0146922 A1 * | 8/2003 | Navab et al. | 345/633 |
| 2004/0041822 A1 * | 3/2004 | Iizuka et al. | 345/634 |
| 2004/0056902 A1 * | 3/2004 | Rekimoto | 345/848 |
| 2004/0105573 A1 * | 6/2004 | Neumann et al. | 382/103 |
| 2004/0201857 A1 * | 10/2004 | Foxlin | 356/620 |
| 2005/0168486 A1 * | 8/2005 | Sato et al. | 345/633 |

FOREIGN PATENT DOCUMENTS

| | | |
|---|---|---|
| EP | 1 117 074 | 7/2001 |
| FR | 2 775 814 | 9/1999 |
| JP | 10-290433 | 10/1998 |
| JP | 11-88913 | 3/1999 |
| JP | 11-309269 | 11/1999 |
| JP | 2000-023037 | 1/2000 |
| WO | WO 99/49648 | 9/1999 |

* cited by examiner

【SELECT CAMERA A AND PLAYER A】
CAMERA A: ZOOM UP PLAYER A
PLAYER A: ". . . . . . . . . . . ." (LINE)

【SELECT CAMERA B AND PLAYER B】
CAMERA A: FOCUS ON PLAYER B
PLAYER B: ". . . . . . . . . . . ." (LINE)
MONSTER APPEARS

【SELECT CAMERAS A AND B】
CAMERA B: SHOOT ENTIRE STUDIO

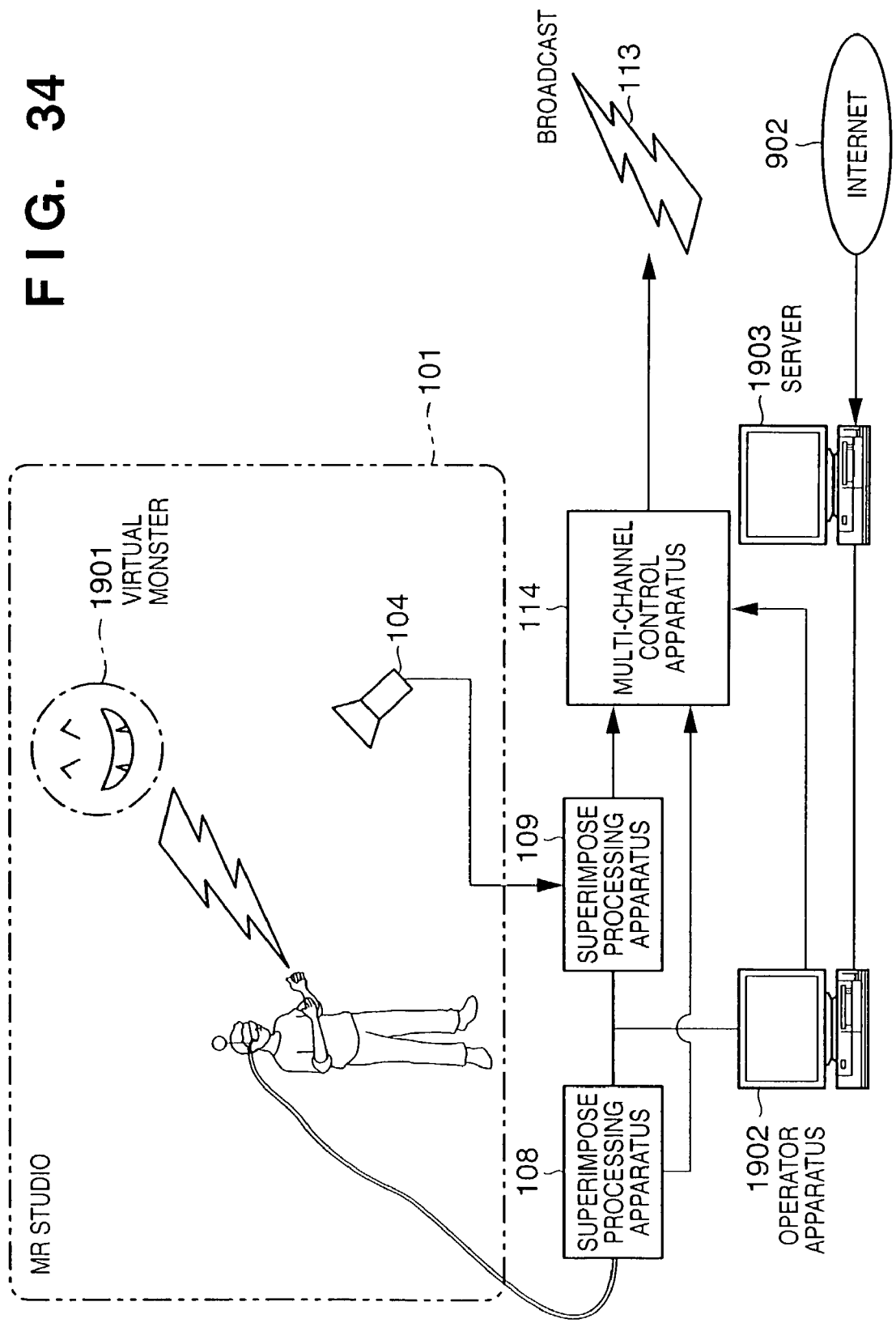

IMAGE PROCESSING APPARATUS AND METHOD WITH SETTING OF PROHIBITED REGION AND GENERATION OF COMPUTER GRAPHICS DATA BASED ON PROHIBITED REGION AND FIRST OR SECOND POSITION/ORIENTATION

BACKGROUND OF THE INVENTION

1. Field of the Invention

The present invention relates to a composition technique of a real image and computer graphics (CG) and, more particularly, to an image processing apparatus and method, and a control program, which are suitably used in shooting of movies and television programs, their rehearsals, plays, games, karaoke, and the like.

2. Description of the Related Art

Conventionally, a technique for compositing a picture taken in a studio and a separately prepared CG picture or a picture taken at another location, and recording or broadcasting that composite video as a video is known. In this technique, shooting in the studio is done using a blue or green wall called a blueback as a background, and a composite picture is generated by a method called chromakey for compositing another picture on the blueback portion.

As applied systems of the technique for compositing a real picture and CG picture, for example, Japanese Patent Laid-Open Nos. 11-309269 and 11-88913 have been proposed. In these systems, a real picture is used as a background, and a CG picture or the like is superimposed on that picture to attain a composition process.

Furthermore, as the use pattern of pictures taken in this way, experiments of interactive television systems using the Internet have been extensively made.

However, in the aforementioned method using a blueback, since the performer cannot see a picture to be composited, his or her action may become unnatural or the degree of freedom in action may be reduced.

In the method of Japanese Patent Laid-Open Nos. 11-309269 and 11-88913, when the relationship between a real picture and a picture to be composited is fixed, the positional deviation between the pictures is negligible. However, when a performer, camera, virtual object, and the like move largely and intricately, it is difficult to obtain an accurate composite picture free from any positional deviation.

On the other hand, in recent years, upon development of head-mounted displays, wearable computers, and the like, a performer can act while observing a composite picture in real time. However, practical user services using such devices have not been proposed yet.

In interactive television experiments conducted so far, viewer participation in terms of camerawork and scenario development have been examined. However, in such experiments, performers cannot directly see virtual characters that serve as viewers. For this reason, interactions between the viewers and performers are limited considerably.

In conventional television broadcast, since advertisements are broadcasted in the intervals of a television program, they may be ignored by viewers who are interested in only the television program, and may be cut by a video deck with a CM cut function, or another channel may be selected.

In order to avoid viewers ignoring television advertisements, Japanese Patent Laid-Open No. 10-290443 embeds CM information in contents. However, this method exploits video on-demand, and cannot be used in prevalent television systems.

On the other hand, advertisements such as advertisement comments on the wall of a stadium during a professional baseball live program may appear in a television program, and these advertisements are never cut since they are broadcasted during the program. However, such advertisements cannot be changed during broadcast, and advertisements that appeal more cannot be made.

Also, in interactive television experiments conducted so far, the viewer can arbitrarily manipulate camerawork or camera positions. However, such viewpoints are objective camera viewpoints of a third party, and it is impossible to see a picture from the subjective viewpoint of a performer such as a main cast or the like.

Currently, the viewer can simultaneously watch pictures of a plurality of channels such as the Internet, satellite broadcast, ground wave broadcast, and the like, and a demand has arisen for multi-channel broadcasting pictures at camera viewpoints and performer viewpoints.

The present invention has been made in consideration of the above prior arts, and has as its object to provide a high-quality composite picture of real and virtual pictures to viewers and the like.

SUMMARY OF THE INVENTION

In order to achieve the object of the present invention, an image processing apparatus of the present invention includes:

first measurement means for measuring a position/posture of photographing means for photographing an object such as a performer or the like;

second measurement means for measuring a position/posture of the object such as the performer or the like;

first image composition means for aligning and compositing CG (Computer Graphics) data at a viewpoint of the photographing means and image data photographed by the photographing means on the basis of a measurement result of the first measurement means;

second composition means for aligning and compositing CG data at a viewpoint of a display means and image data of real image based on the position/posture of the object on the basis of a measurement result of the second measurement means; and display control means for displaying the image data formed by the second composition means on the display means.

In order to achieve the object of the present invention, an image processing apparatus of the present invention includes:

first measurement means for measuring a position/posture of photographing means for photographing an object such as a performer or the like;

second measurement means for measuring a position/posture of the object such as the performer or the like;

first image composition means for aligning and compositing CG (Computer Graphics) data at a viewpoint of the photographing means and image data photographed by the photographing means on the basis of a measurement result of the first measurement means; and display control means for controlling a position of CG data at a viewpoint of a display means on the basis of a measurement result of the second measurement means, and displaying the CG data on the display means.

In order to achieve the object of the present invention, an image processing method of the present invention includes the steps of:

measuring a position/posture of photographing means for photographing an object such as a performer or the like;

measuring a position/posture of the object such as the performer or the like;

aligning and compositing CG (Computer Graphics) data at a viewpoint of the photographing means and image data photographed by the photographing means on the basis of a measurement result of the position/posture of the photographing means;

aligning and compositing CG data at a viewpoint of a display means and image data of real image based on the position/posture of the object on the basis of a measurement result of the position/posture of the display means; and displaying image data on the display means.

In order to achieve the object of the present invention, an image processing method of the present invention includes the steps of:

measuring a position/posture of photographing means for photographing an object such as a performer or the like;

measuring a position/posture of the object such as the performer or the like;

aligning and compositing CG (Computer Graphics) data at a viewpoint of the photographing means and image data photographed by the photographing means on the basis of a measurement result of the position/posture of the photographing means; and controlling a position of CG data at a viewpoint of a display means on the basis of a measurement result of the position/posture of the display means, and displaying the CG data on the display means.

In order to achieve the object of the present invention, a control program of the present invention includes commands for performing steps of:

measuring a position/posture of photographing means for photographing an object such as a performer or the like;

measuring a position/posture of the object such as the performer or the like;

aligning and compositing CG (Computer Graphics) data at a viewpoint of the photographing means and image data photographed by the photographing means on the basis of a measurement result of the position/posture of the photographing means;

aligning and compositing CG data at a viewpoint of a display means and image data of real image base on the position/posture of the object on the basis of a measurement result of the position/posture of the display means; and displaying image data on the display means.

In order to achieve the object of the present invention, a control program of the present invention includes commands for performing steps of:

measuring a position/posture of photographing means for photographing an object such as a performer or the like;

measuring a position/posture of the object such as the performer or the like;

aligning and compositing CG (Computer Graphics) data at a viewpoint of the photographing means and image data photographed by the photographing means on the basis of a measurement result of the position/posture of the photographing means; and controlling a position of CG data at a viewpoint of a display means on the basis of a measurement result of the position/posture of the display means, and displaying the CG data on the display means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 34 is a schematic system diagram showing the arrangement of a photographing studio system to which the 10th embodiment of the present invention is applied.

DETAILED DESCRIPTION OF THE PREFERRED EMBODIMENTS

Preferred embodiments of the present invention will now be described in detail in accordance with the accompanying drawings.

First Embodiment

Figure 1:
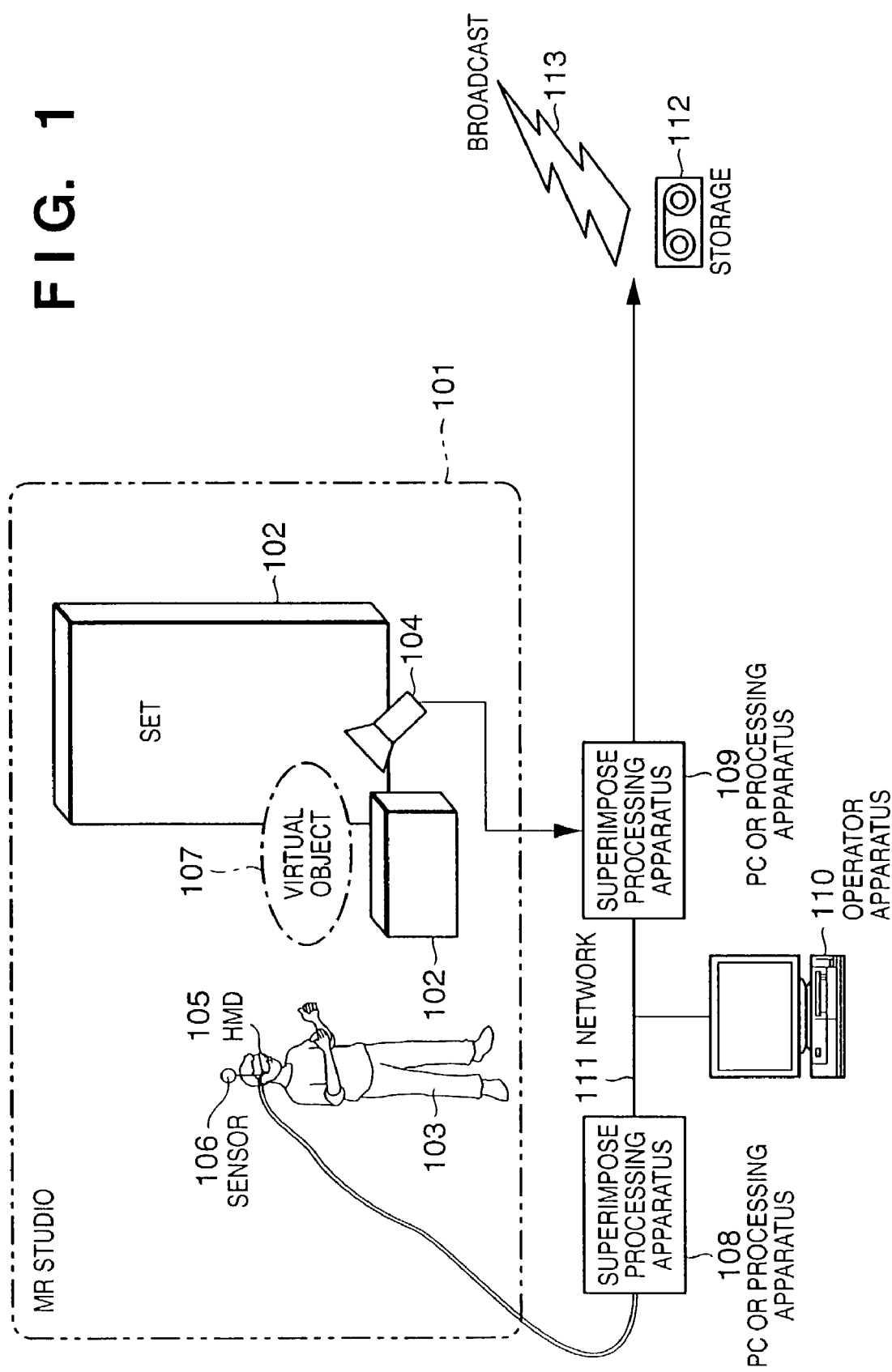
FIG. 1 is a schematic system diagram showing the arrangement of a photographing studio system to which the first embodiment of the present invention is applied.

FIG. 1 is a schematic system diagram showing the arrangement of a photographing studio system to which the first embodiment of the present invention is applied. Referring to FIG. 1, reference numeral 101 denotes a studio as a photographing site; 102, a set placed in the studio; 103, a performer; 104, a movie camera; 105, a head-mounted display (to be abbreviated as an HMD hereinafter) that the performer wears; 106, a position sensor built in the HMD; 107, a virtual object which is superimposed on a picture that the performer sees, and a camera picture; 108, a superimpose processing apparatus for generating a picture that the performer sees; 109, a superimpose processing apparatus for superimposing a picture of the virtual object on the camera picture; 110, an operator apparatus for manipulating the state of the virtual object; 111, a network that connects the apparatuses 108, 109, and 110; 112, a video apparatus for storing the output from the apparatus 109; and 113, a transmission apparatus for transmitting or broadcasting the output from the superimpose processing apparatus 109.

As the position sensor 106, for example, devices such as a magnetic position/direction sensor, Fastrak available from Polhemus Incorporated, and the like may be used. The superimpose processing apparatus 108 or 109 can comprise a combination of a PC (personal computer) and a video capture card or a video card with a CG rendering function. The operator apparatus 110 can comprise a normal PC.

The number of sets of the superimpose processing apparatus 108, HMD 105, and the like can be increased in correspondence with the number of performers or the number of staff members who observe at the same time, and the number of sets of the superimpose processing apparatus 109, camera 104, and the like can be increased in correspondence with the number of cameramen.

Figure 2:
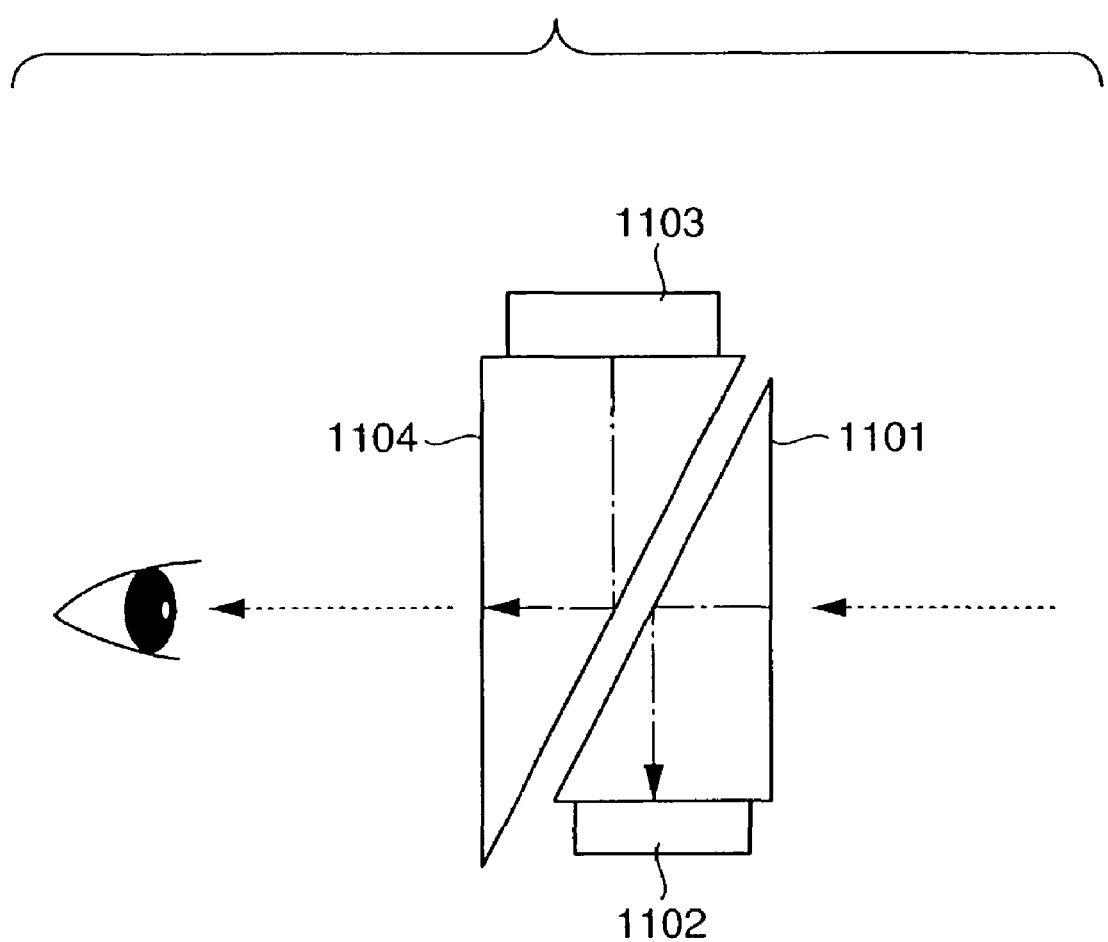
FIG. 2 is a view showing the internal structure of an HMD.

FIG. 2 shows the internal structure of the HMD 105. The HMD 105 comprises a prism optical element 1101 for internally guiding incoming external light, an image sensing element 1102 for receiving and sensing the light, a display element 1103 for presenting a picture, a prism optical element 1104 for guiding the displayed picture to the eye, and the like, since it has functions of both a display device and an image sensing device.

The set 102 is placed in the studio 101, and the performer 103 acts in that studio. The performer 103 wears the HMD 105 with the built-in position sensor 106, which outputs the position information of the HMD 105. Also, a camera (image sensing element 102 or the like) is built in the HMD 105 and outputs sensed picture data.

The operator apparatus 110 is used to make instructions for displaying and moving the virtual object 107. These instruction signals are transferred to the superimpose processing apparatuses 108 and 109 via the network 111. The superimpose processing apparatus 108 generates a CG picture in accordance with the instructed state of the virtual object 107 and the head position information obtained from the position sensor 106 or the like, composites that CG picture with sensed picture data obtained from the HMD 105, and outputs the composite picture to the HMD 105. By watching the composite picture displayed on the HMD 105, the performer 103 can observe the virtual object 107 as if it were present in the set 102.

The camera 104 senses the state of the studio 101 including the performer 103 and set 102, and outputs the sensed picture data to the superimpose processing apparatus 109. The superimpose processing apparatus 109 generates a CG picture corresponding to the state of the virtual object 107 according to an instruction from the operator apparatus 110, and the position and posture of the camera 104, and composites that picture with picture data obtained from the camera 104, thus generating an output picture. This output picture is recorded by the video apparatus 112 or is broadcasted via the transmission apparatus 113.

Figure 3:
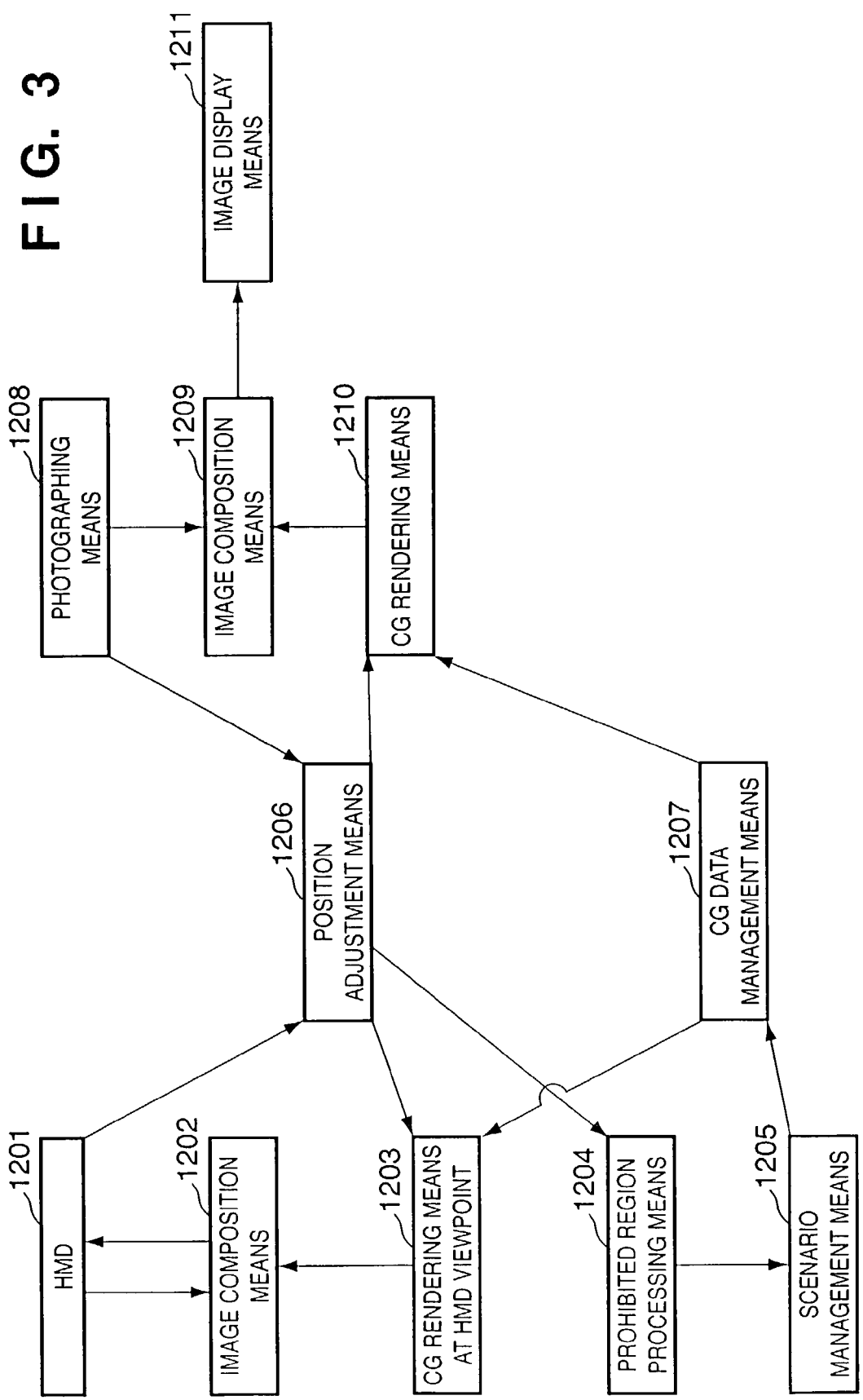
FIG. 3 is a functional block diagram showing the functions of the system shown in FIG. 1.

FIG. 3 is a functional block diagram showing the functions of the system shown in FIG. 1.

Reference numeral 1201 denotes an HMD which has a so-called see-through function, and comprises an image sensing unit and image display unit. Reference numeral 1202 denotes an image composition means; 1203, a CG rendering means at the HMD viewpoint; 1204, a prohibited region processing means for controlling the existence range of a CG object; 1205, a scenario management means; 1206, a position adjustment means including a position sensor and the like; 1207, a CG data management means; 1208, a photographing means such as a camera or the like; 1209, an image composition means; 1210, a CG rendering means; and 1211, an image display means.

An image sensed by the HMD 1201 is composited with a CG image generated by the CG rendering means 1203 by the image composition means 1202, and that composite image is displayed on the HMD 1201. An image sensed by the HMD 1201 is also sent to the position adjustment means 1206, which calculates the position/direction of the HMD (i.e., the head) on the basis of that image and tracking information obtained from a position sensor or the like, and sends the calculated information to the CG rendering means 1203. The CG rendering means 1203 renders a CG image at the HMD viewpoint on the basis of the position/direction information of the head obtained by the position adjustment means 1206 and CG data obtained from the CG data management means 1207.

The scenario management means 1205 sends information required for a scene configuration to the CG data management means 1207 in accordance with information obtained from the prohibited region processing means 1204, the progress of a rehearsal or action or operator's instructions, and the like, and the CG data management means 1207 instructs the CG rendering means 1203 or 1210 to render a CG image in accordance with the received information.

The same applies to a process for an image obtained by the photographing means 1208. That is, an image sensed by the photographing means 1208 is composited with a CG image generated by the CG rendering means 1210 by the image composition means 1209, and the obtained composite image is displayed on the image display means 1211. An image sensed by the photographing means 1208 is also sent to the position adjustment means 1206, which calculates the position/direction of the photographing means (i.e., a camera) on the basis of that image and tracking information obtained from a position sensor or the like, and sends the calculated information to the CG rendering means 1210.

The CG rendering means 1210 renders a CG image at the camera viewpoint on the basis of the position/direction information of the head obtained by the position adjustment means 1206 and CG data obtained from the CG data management means 1207. The position adjustment means 1206 sends the calculated position/direction data of the HMD (i.e., the head) and the position/direction data of the photographing means (i.e., the camera) to the prohibited region processing means 1204, which determines a range where a CG object is to exist, on the basis of these position/direction data, and the scenario management means 1205 corrects the position of the CG object in accordance with the range where the CG object is to exist.

Information required for CG rendering, which is managed by the scenario management means 1205 includes the number of a CG model to be displayed, reference position/posture data, the number indicating the type of action, parameters associated with the action, and the like for each individual character to be displayed. The scenario is managed for each scene, and the aforementioned data set is selected in accordance with the status values of each character such as a power, state, and the like, the operation input from the operator, the action of the performer, and the like in each scene. For example, the number of a CG model to be displayed is determined based on the randomly selected type of character and the power value (which increases/decreases by points with the progress of a game) of that character.

The operator inputs information associated with movement, rotation, and the like of the character, and the reference position/posture data is determined based on that input information. The position, posture, and status value of the character, and the position, posture, and action of the performer in this case determine the action and parameters of the character. Note that the position and posture are corrected by a prohibited region process.

Note that the see-through function of the HMD 1201 can also be implemented by arranging the HMD to allow the user to see through the external field (optical see-through scheme). In this case, the aforementioned image composition means 1202 is omitted.

The position adjustment means 1206 may comprise means for detecting a three-dimensional position/posture such as a mechanical encoder or the like, the aforementioned magnetic position sensor, or optical position adjustment means or that using image recognition or the like. The position adjustment of the photographing means 1208 and that of the HMD 1201 may be done by independent position adjustment means.

Figure 4:
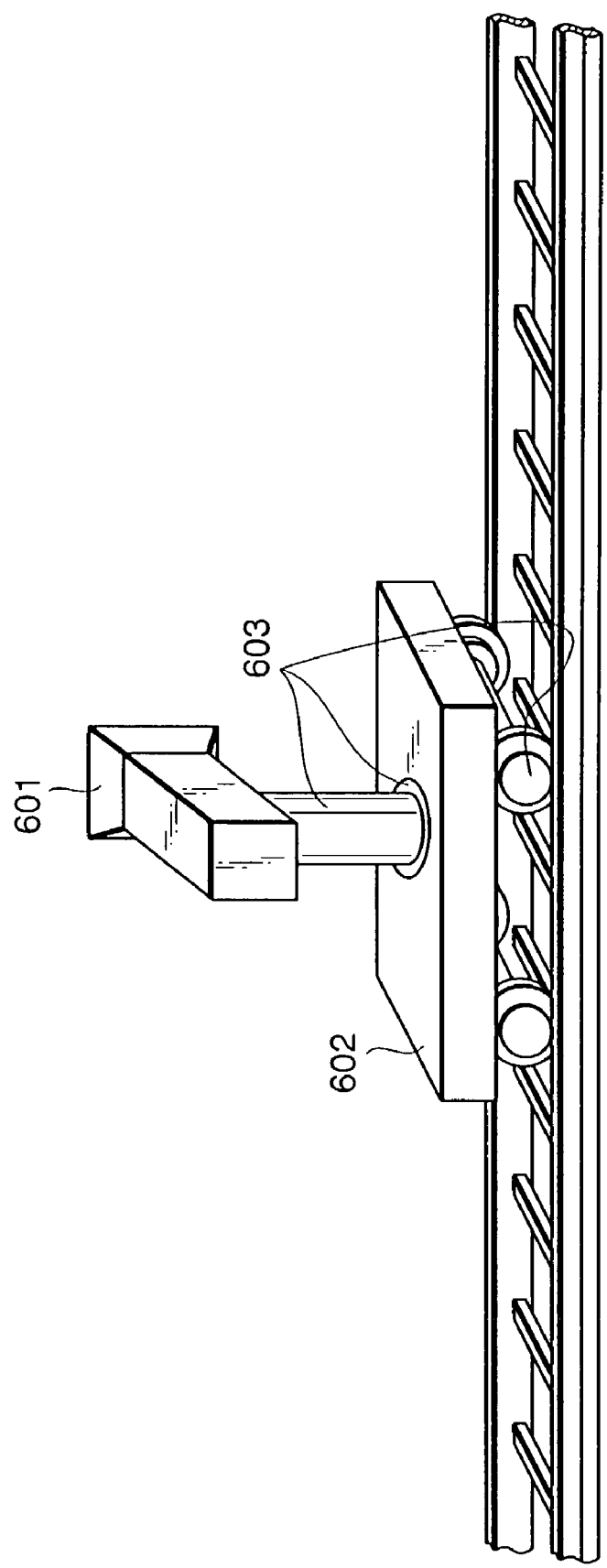
FIG. 4 is a perspective view showing a camera photographing device using a mechanical encoder.

FIG. 4 shows an example of a camera photographing device using a mechanical encoder. Each joint is attached with a measurement device 603 such as a rotary encoder or the like, and the position and direction of the camera from the position of a dolly 602 that carries a camera 601 can be measured and output. Note that the output from the image composition means 1208 can be displayed on a viewfinder of the camera 601. In this manner, the cameraman can make camerawork in correspondence with a virtual world.

Figure 5:
FIG. 5 is a perspective view showing a hand-held camera photographing device using a magnetic position/direction sensor.

FIG. 5 shows an example of a hand-held camera photographing device that uses a magnetic position/direction sensor. A magnetic receiver (measurement device) 702 is fixed to a camera 701, and the three-dimensional position and direction of the camera 701 are calculated based on the measured magnetic state. As described above, the position/direction can be measured using, e.g., Fastrak available from Polhemus Incorporated. The position and direction of the HMD are measured by the same method. In case of such hand-held device, a cameraman wears an HMD 703 (or its single-eye version), and a composite image is displayed on the HMD 703, thus allowing camerawork in correspondence with a virtual world.

Furthermore, in case of a camera photographing device with a zoom function, zoom information of a zoom lens is sent to an external processing apparatus.

The CG data management means 1207 records three-dimensional models such as three-dimensional animation data of CG characters and the like, and image data of real images and the like. The CG data management means 1207 selects a CG model or animation to be displayed in accordance with the number of a CG model, the reference position/posture data, the number indicating the type of action, parameters associated with the action, and the like for each character, which are received from the scenario management means 1205, and sets parameters of the position, posture, and the like of the selected CG model, thus changing a scene graph used in CG rendering.

The scenario management means 1205 stores information such as a script, lines, comments, and the like required to help actions, and sends required information to the CG data management means 1207 in accordance with each scene. The CG data management means 1207 instructs the CG rendering means 1203 and 1210 to execute a rendering process according to such information. Each scene progresses using an arbitrary user interface (mouse, keyboard, voice input, or the like).

Figure 6:
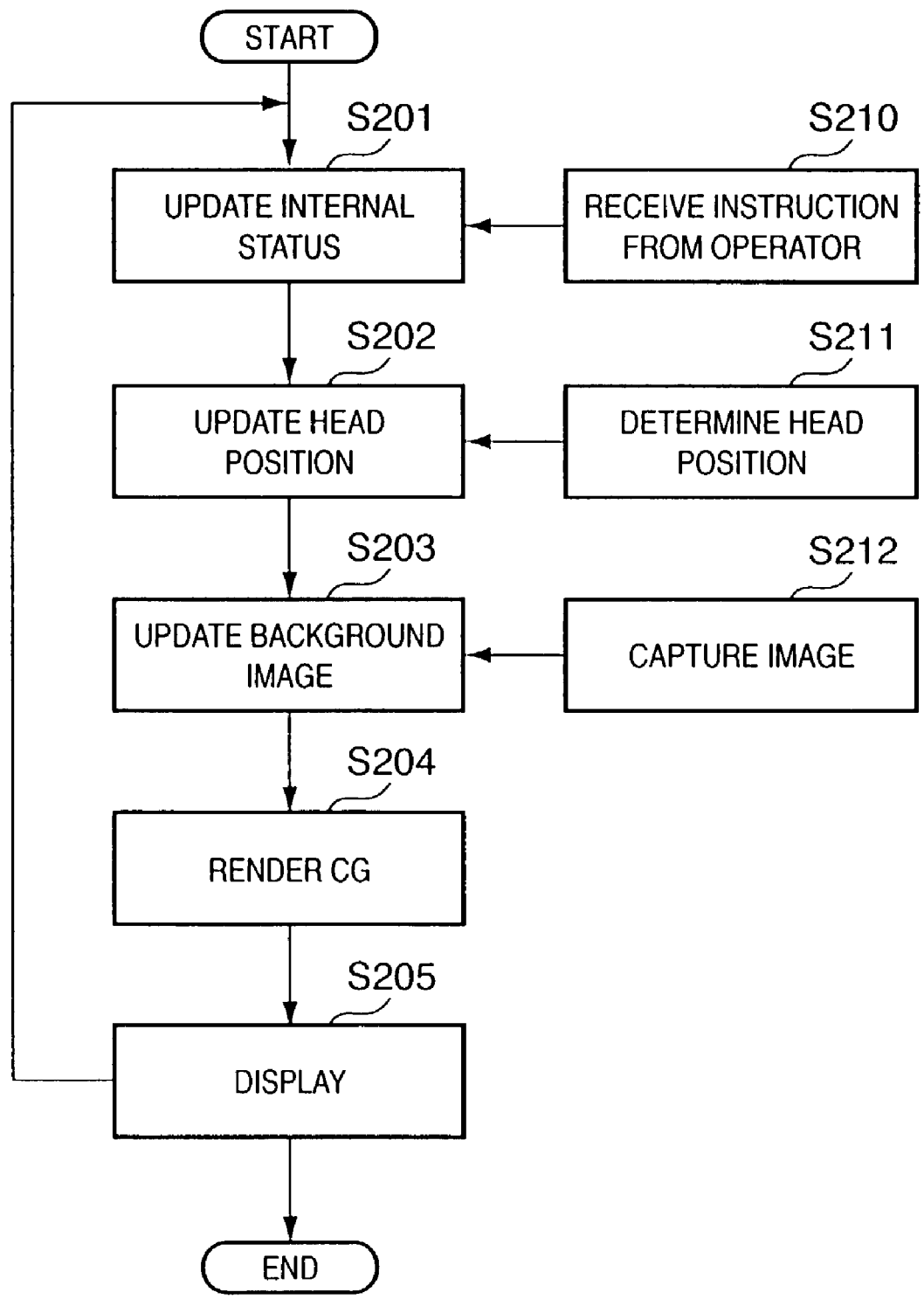
FIG. 6 is a flow chart showing a display process for the HMD.

FIG. 6 is a flow chart showing the process for generating a picture to be displayed on the HMD 105 that the performer 103 wears. Processes of threads S210 to S212 are implemented by threads, which run independently and parallelly, using a parallel processing program technique, which is widespread in the art in recent years.

A process in the superimpose processing apparatus 108 executes an update process of internal status data (e.g., to update status flags (the type, position, and status of an object to be displayed) for rendering a CG) (step S201) in accordance with an instruction obtained from the operator apparatus 110 (thread S210). Head position information obtained by a head position determination process (thread S211) is fetched (step S202).

The latest image obtained by an image capture process (thread S212) using the video capture card is captured as a background image (step S203). CG data is updated on the background image in accordance with the internal status data set in step S201, and a CG is rendered to have the head position set in step S202 as the position of a virtual camera used in CG generation (step S204). Finally, a CG command for displaying a composite picture as the rendering result is supplied to the video card, thus displaying the composite picture on the HMD (step S205).

Thread S210 is a thread for receiving instruction data from the operator apparatus via the network 111, thread S211 is a thread for receiving information from the position sensor 106 and determining the head position using the received information and image data obtained from the video capture card together, and thread S212 is an image capture thread for periodically reading out image data from the video capture card.

Figure 7:
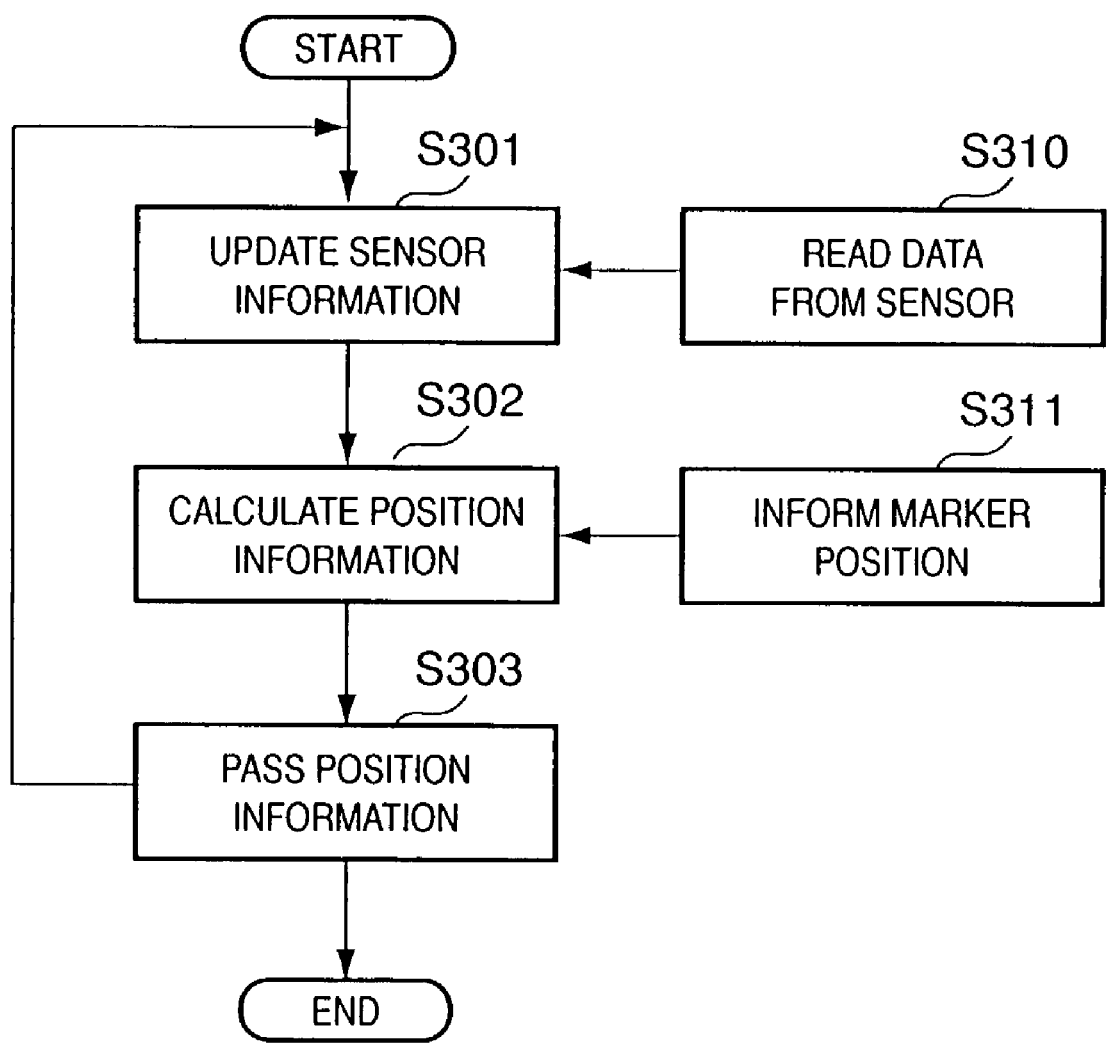
FIG. 7 is a flow chart showing a head position determination process.

FIG. 7 is a flow chart showing the head position determination process. Step S301 is a sensor information update step, step S302 is a position information calculation step, step S303 is a position information passing step, thread S310 is a thread for reading data from the sensor, and thread S311 is a thread for receiving a marker position message.

Note that data from the sensor is output to a normal RS232C port, and thread S310 periodically reads out data at that port. The message in thread S311 is sent using a general network communication protocol (TCP-IP).

The superimpose processing apparatus 108 updates the head position to a position corresponding to the latest position information obtained from the position sensor 106 (step S301). Then, a specific marker image is recognized from image data obtained by the camera of the HMD 105 to acquire correction information of the head position, and direction data of the head is updated in accordance with the correction information (step S302). Finally, the position data (including direction) of the head is passed to head position determination thread S211 (step S303).

The head direction is corrected as follows. That is, a predicted value (x0, y0) indicating the position of a marker in an image is calculated based on the three-dimensional position and direction of the head (viewpoint) in a world coordinate system, which are obtained from the position sensor 106, and the three-dimensional position of the marker. A motion vector from this predicted value (x0, v0) to the actual marker position (x1, y1) in the image is calculated. Finally, a value obtained by rotating the direction of the head through an angle that looks in this vector as a correction value is output as the direction of the HMD 105.

Figure 8:
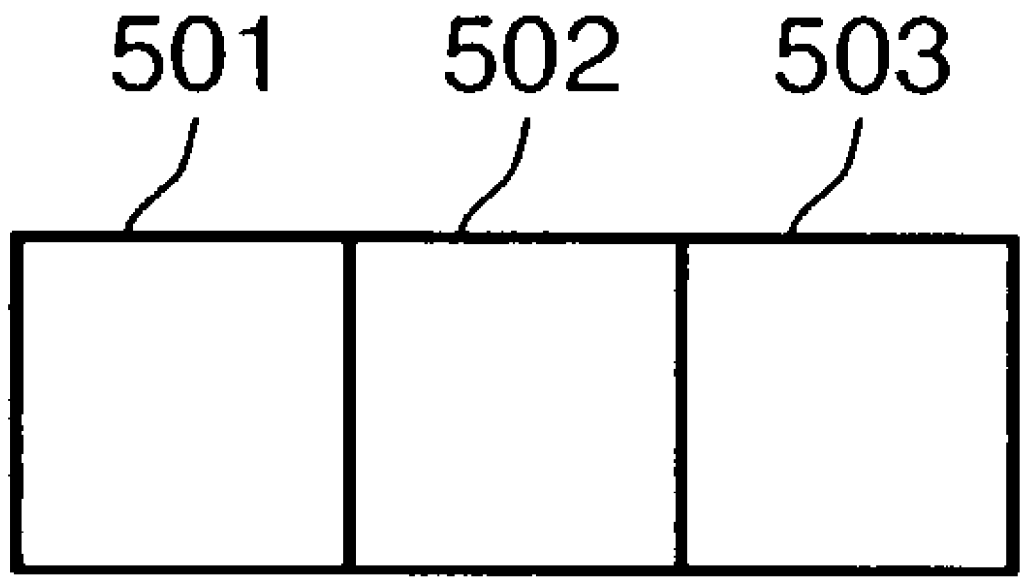
FIG. 8 shows an example of a marker adhered in a studio for position measurement.

FIG. 8 shows an example of the marker adhered in the studio 101 for position measurement. A monochrome marker may be used. However, this embodiment uses a marker having three rectangular color slips with a specific size, which are laid out to have a specific positional relationship. For respective color slips, arbitrary colors can be selected. Using such marker, a large number of types of markers can be stably detected.

Figure 9:
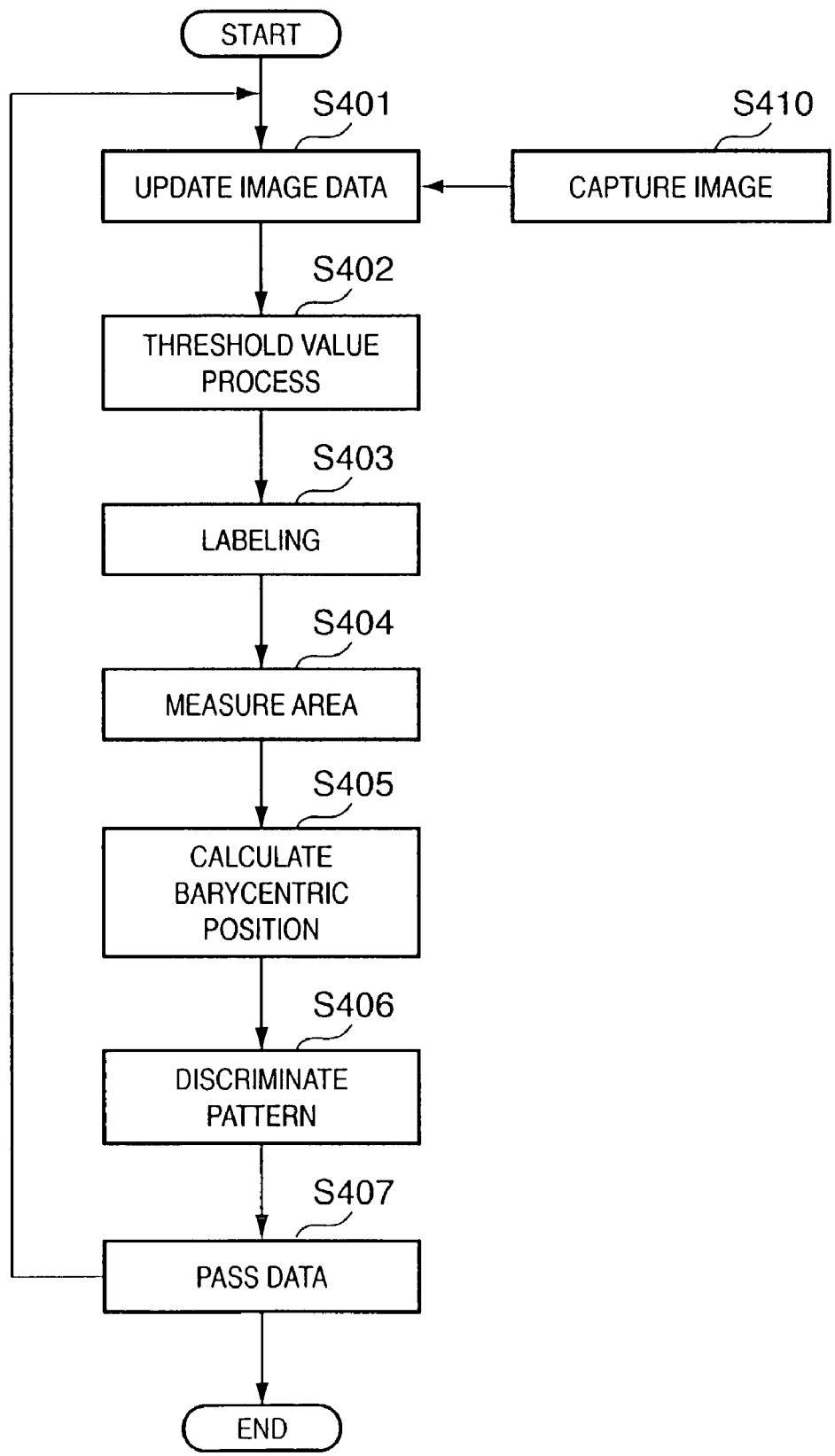
FIG. 9 is a flow chart showing a marker position determination process.

FIG. 9 is a flow chart showing the flow of the marker position determination process. Thread S410 is a thread for obtaining image data which is to undergo image recognition, i.e., a thread for periodically reading out an image from the image capture card.

Step S401 is an image data update step, step S402 is a threshold value process step, step S403 is a labeling step, step S404 is an area calculation step, step S405 is a barycenter calculation step, step S406 is a pattern discrimination step, and step S407 is a step of passing position information as the calculation result.

The superimpose processing apparatus 108 or 109 updates image data to the latest one (step S401), and executes a threshold value process of the image using some pieces of color information used to discriminate the registered marker (step S402). Then, the apparatus 108 or 109 couples obtained binary images and executes their labeling process (step S403), counts the areas of respective label regions (step S404), and calculates the barycentric position (step S405).

It is checked based on the relationship between the label areas and the barycentric position between labels if the image matches the registered mark pattern (step S406), and the barycentric position of the central label that matches the image is output as the marker position (step S407).

The output marker position information is used to correct the direction of the HMD 105 or camera 104. By setting information of the position and direction of the HMD or camera as those of the virtual camera upon CG rendering, a CG image which is aligned to the real world is generated.

Figure 10:
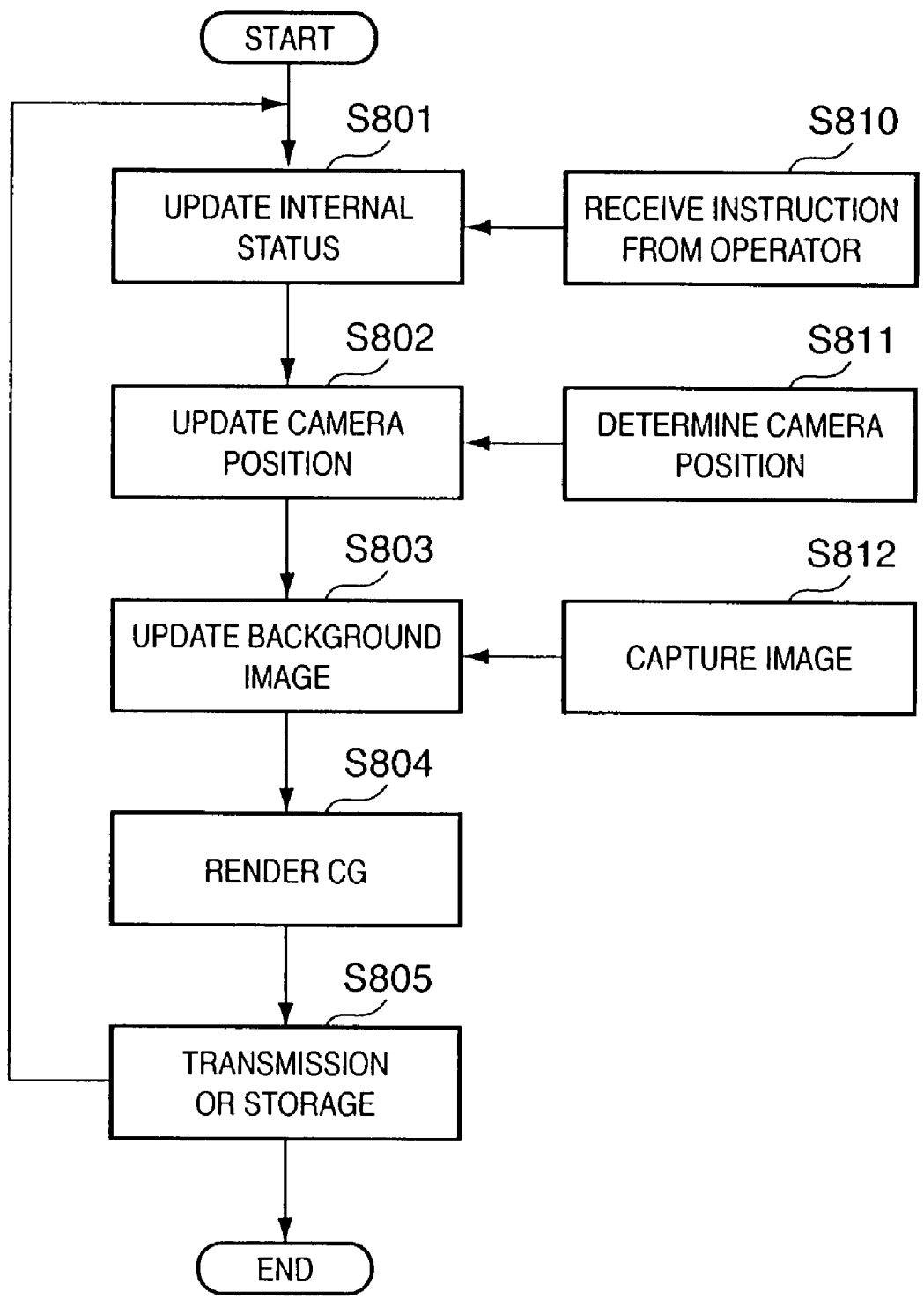
FIG. 10 is a flow chart showing a process for a picture obtained from a camera.

FIG. 10 is a flow chart showing the flow of the process of the superimpose processing apparatus 109 which superimposes a picture of the virtual object on the picture obtained by the camera 104 or photographing means 1208. Processes of threads S810 to S812 are implemented by threads, which run independently and parallelly, using a parallel processing program technique, which is generalized in the corresponding field in recent years.

A process in the superimpose processing apparatus 109 executes an update process of internal status data (e.g., to update status flags (the type, position, and status of an object to be displayed) for rendering a CG) (step S801) in accordance with an instruction obtained from the operator apparatus 110 (thread S810).

Camera position information obtained from the camera position determination process (thread S811) is fetched (step S802). The latest image obtained by the image capture process (thread S812) using the video capture card is captured as a background image (step S803). CG data is updated on the background image in accordance with the internal status data set in step S801, and a CG is rendered to have the camera position set in step S802 as the position of a virtual camera used in CG generation (step S804). Finally, a CG command for displaying a composite picture as the rendering result is supplied to the video card, thus displaying the composite picture on the display device (step S805).

Thread S810 is a thread for receiving instruction data from the operator apparatus via the network 111, thread S811 is a thread for receiving information from the camera device shown in FIG. 4 or 5, and determining the camera position using the received information and image data obtained from the video capture card together, and thread S812 is an image capture thread for periodically reading out image data from the video capture card.

In this embodiment, a real-time composite picture is the output from the superimpose processing apparatuses 108 and 109. Alternatively, when picture data obtained by the image sensing means (or HMD) and data indicating the position/posture of the image sensing means (or HMD) are separately output, data used in so-called post-production (a process for generating a video picture as a final product in a post-process by spending a long time) can be obtained at the same time.

Figure 11:
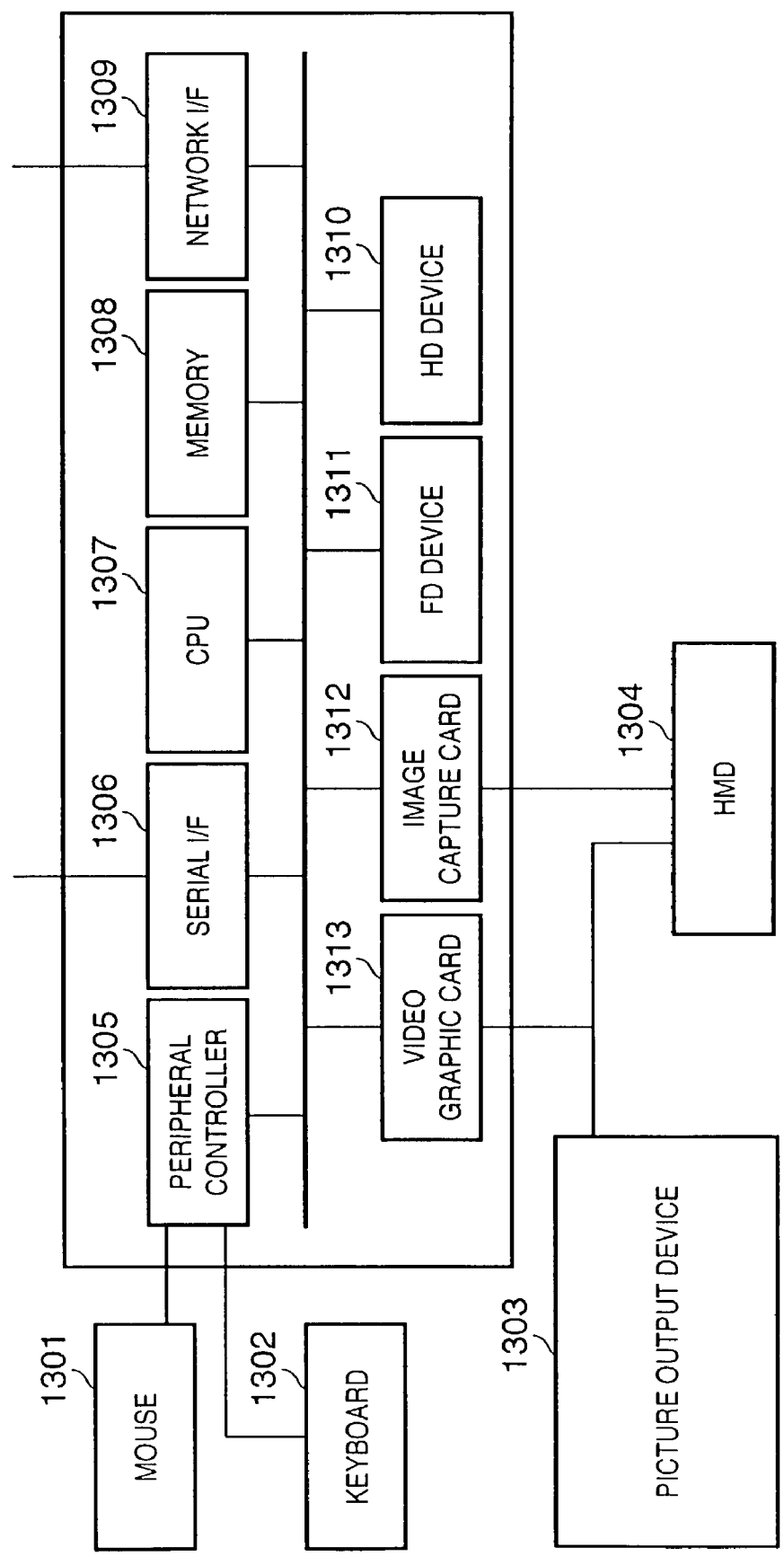
FIG. 11 is a block diagram showing the hardware arrangement of a superimpose processing apparatus that processes an image to be displayed on the HMD.

Hardware which forms the superimpose processing apparatus 108 or 109, or the operator apparatus 110 can be implemented by combining a general computer and peripheral devices. FIG. 11 is a schematic diagram of such hardware arrangement.

FIG. 11 shows an example of the hardware arrangement of the superimpose processing apparatus 108, which is constituted by a computer system or the like including an HMD 1304 that actually senses and displays an image, a mouse 1301, a keyboard 1302, a picture output device 1303, and the like.

More specifically, the superimpose processing apparatus 108 comprises a peripheral controller 1305 for controlling peripheral devices such as the mouse 1301, keyboard 1302, and the like, an HD device 1310 and memory 1308 which store programs, a video or image capture card 1312 for capturing picture data, a video graphic card 1313 used to implement CG rendering and image composition, a serial I/F 1306 used to exchange information with the position sensor, a network I/F 1309 used to connect a network, a CPU 1307 for executing various processes based on programs, an FD device 1311 for loading programs from media, and the like.

In case of the superimpose processing apparatus 109, an input is received from the photographing device (camera) in place of that from the HMD 1304, and a picture signal is output to an image display device. In case of the operator apparatus 110, the HMD 1304 and image capture card 1312 can be omitted. The programs which implement this embodiment can be loaded from a program medium via the FD device 1311, a network, or the like.

Figure 12:
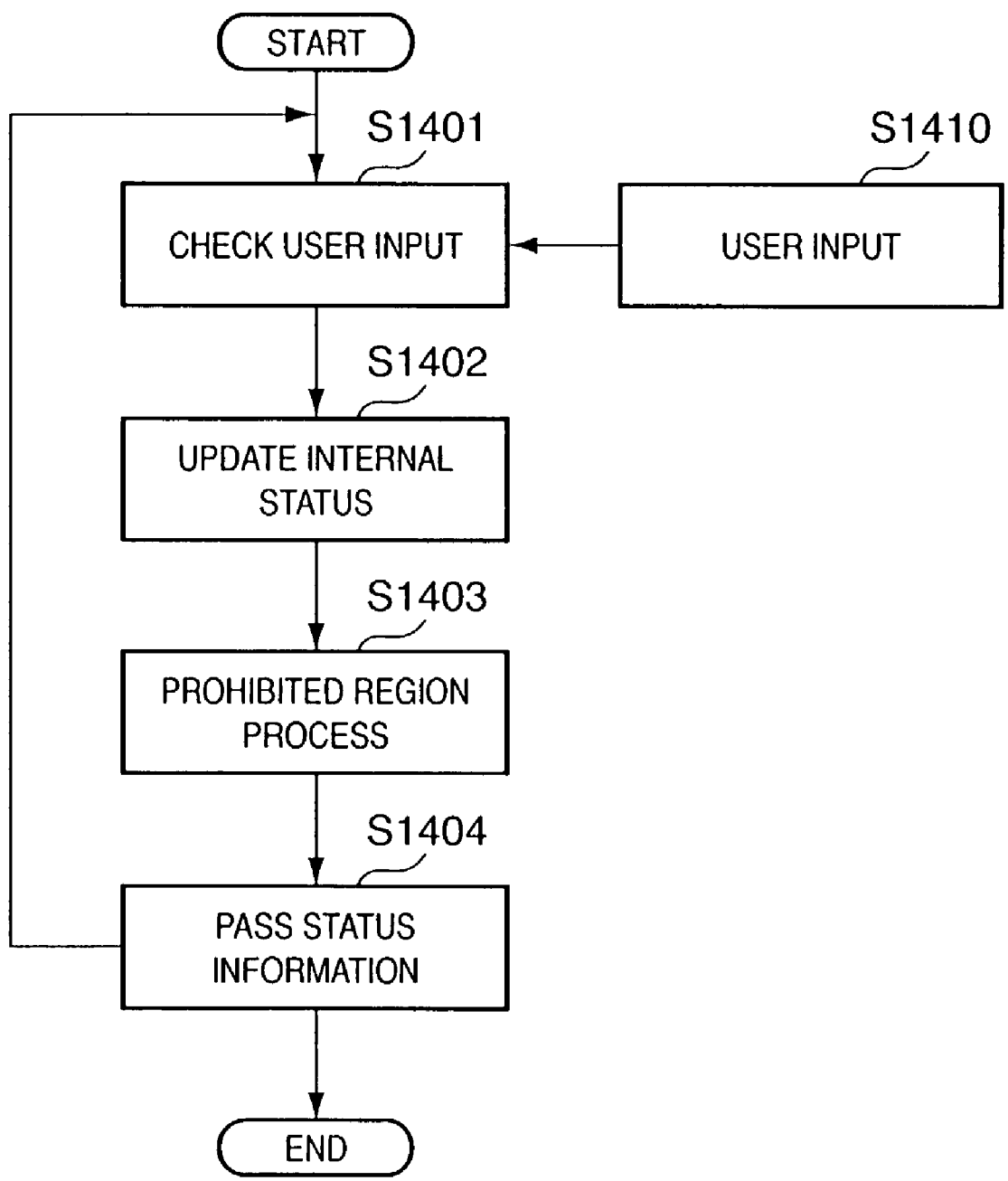
FIG. 12 is a flow chart showing the processing contents of an operator apparatus.

FIG. 12 is a flow chart showing the flow of the process of the operator apparatus 110.

The operator apparatus 110 receives user's operation input (step S1401), and updates internal status data (scenario progress pointer, display mode, and the like) in accordance with the received input (step S1402). Then, the apparatus 110 determines a prohibited region on the basis of the position information of the camera 104 and performer 103, and updates the position data so that a virtual CG object does not fall within this prohibited region (step S1403). The apparatus 110 sends the updated internal status information to the superimpose processing apparatuses 108 and 109 (step S1404).

User's input operation can be made using an input device such as the mouse 1301, keyboard 1302, or the like or via a voice input, gesture command, or the like.

Note that the prohibited region process prohibits an existence region of a CG object to prevent an occlusion conflict between a virtual CG object and real object. In occlusion management, in case of a stationary real object, a CG object is set in advance to have the same shape and position/direction of the real object, an actually shot picture is used on the region of the CG object corresponding to the real object, and upon rendering a virtual object, an occlusion surface process with a CG object corresponding to the set real object is executed, thus correctly processing occlusion between the real object and virtual CG object.

On the other hand, in case of a real object which moves or deforms like the performer 103, it is not easy to settle a spatial region occupied by that object. When the real performer or the like and virtual object approach toward each other or one of them is occluded by the other, if occlusion cannot be correctly processed, a viewer may see an object which should not be seen, or the depth ordering of these objects may be reversed upon observation, resulting in a serious visual difficulty.

In this embodiment, a region where such visual difficulty is more likely to occur is set as the prohibited region, and when the virtual object enters that prohibited region, the position of the virtual object is corrected to fall outside the prohibited region, thereby removing the visual difficulty.

Figure 13:
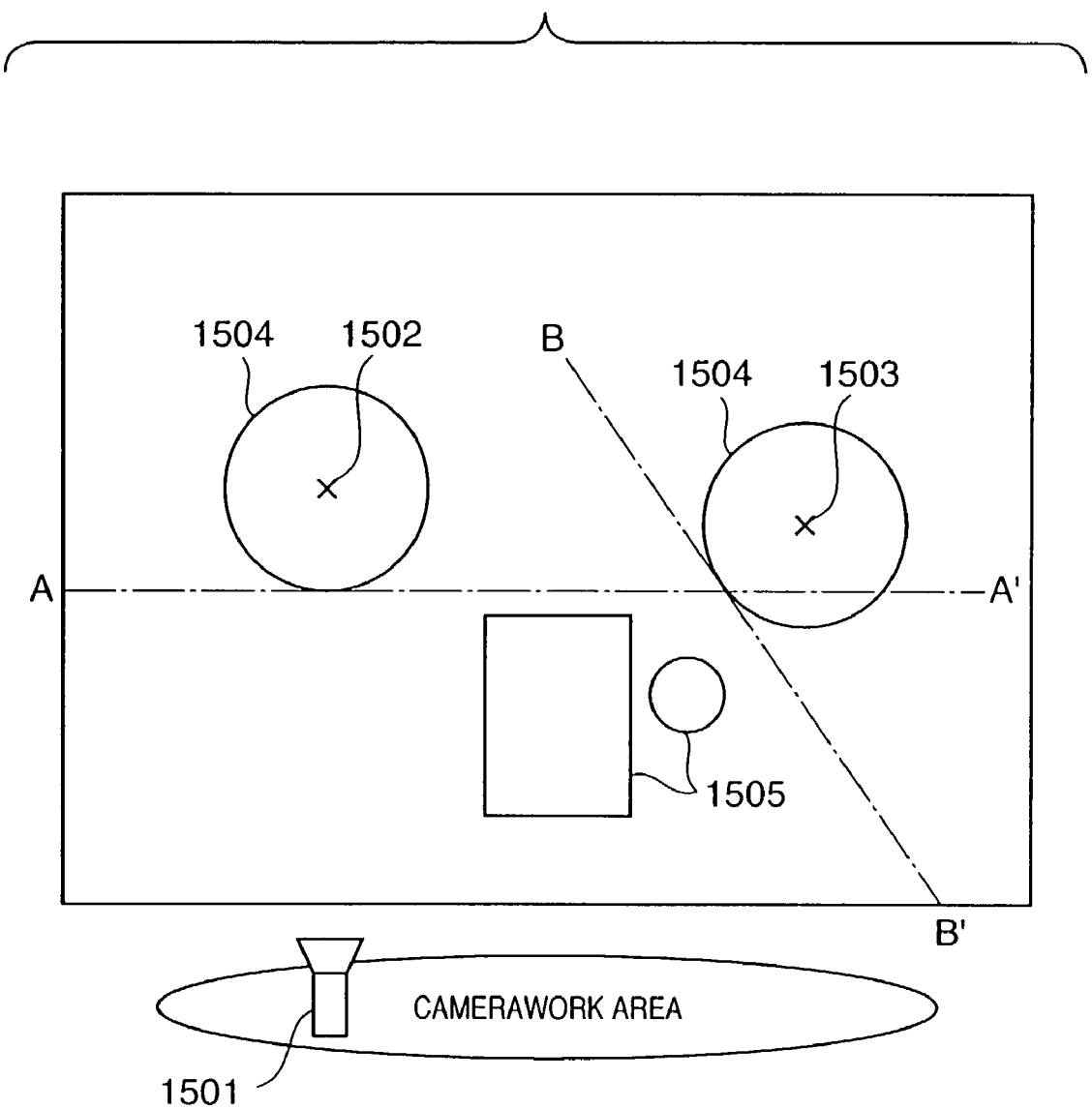
FIG. 13 is a bird's-eye view of a studio to show the simplest prohibited region.

FIG. 13 is a bird's-eye view of the studio 101 to show the simplest prohibited region. Reference numeral 1501 denotes a photographing means (camera); 1502 and 1503, mobile real objects such as a performer and the like; 1504, surrounding regions of the performer 103 and the like; and 1505, stationary real objects (studio set and the like).

When a line AA' that passes a point, which is offset from the real object 1502 toward the camera by the radius of the surrounding region 1504, on a line that connects the camera 1501 and real object 1502, and is perpendicular to that line is calculated, one of spaces divided by the line AA', in which no camera 1501 is present, is set as a prohibited region. In practice, a region including the prohibited region is defined, but no problem is posed since that region can remove the visual difficulty. Likewise, a dividing line BB' for another real object 1503 and its prohibited region can be calculated, and the overall prohibited region is determined as the sum set of those regions.

Figure 14:
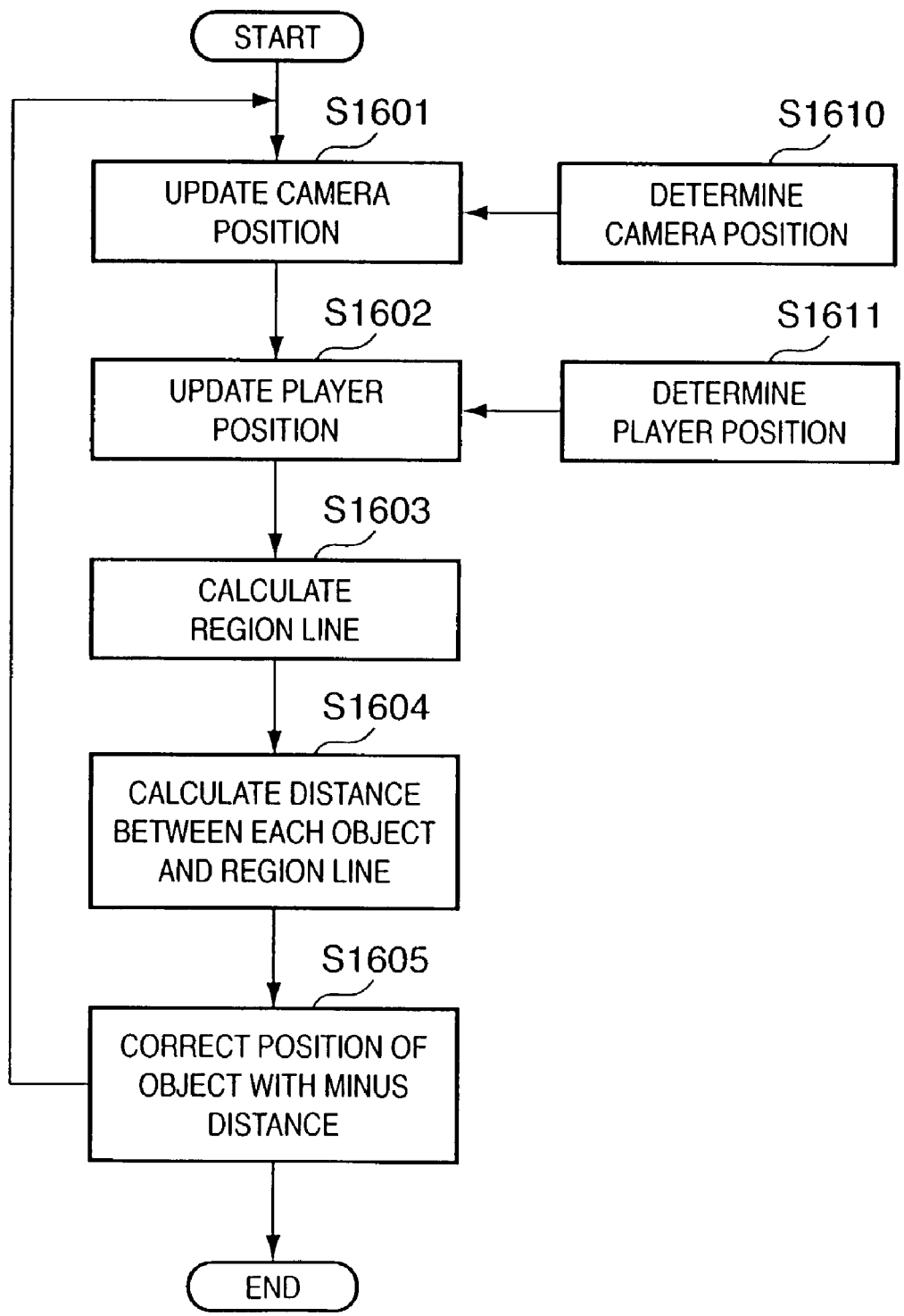
FIG. 14 is a flow chart showing a prohibited region calculation process.

FIG. 14 is a flow chart of the aforementioned prohibited region calculation process. A camera position determination process (thread S1610) and player position determination process (thread S1611) are parallelly executed as independent threads.

In a main process, the position information of the camera is updated to the latest camera position (step S1601), the position information of the performer (player) is updated to the latest player position (step S1602), a region dividing line is calculated from those pieces of information (step S1603), and the distance from the region dividing line to each virtual object is calculated (step S1604).

It is checked based on the plus/minus sign of the calculated distance value if the virtual object of interest falls within the prohibited region. If the distance value has the minus sign and it is determined that the virtual object of interest falls within the prohibited region, the position of that virtual object is corrected to the closest point outside the region (this point can be calculated as an intersection between a line that connects the camera and that virtual object and the region dividing line) (step S1605).

Figure 15:
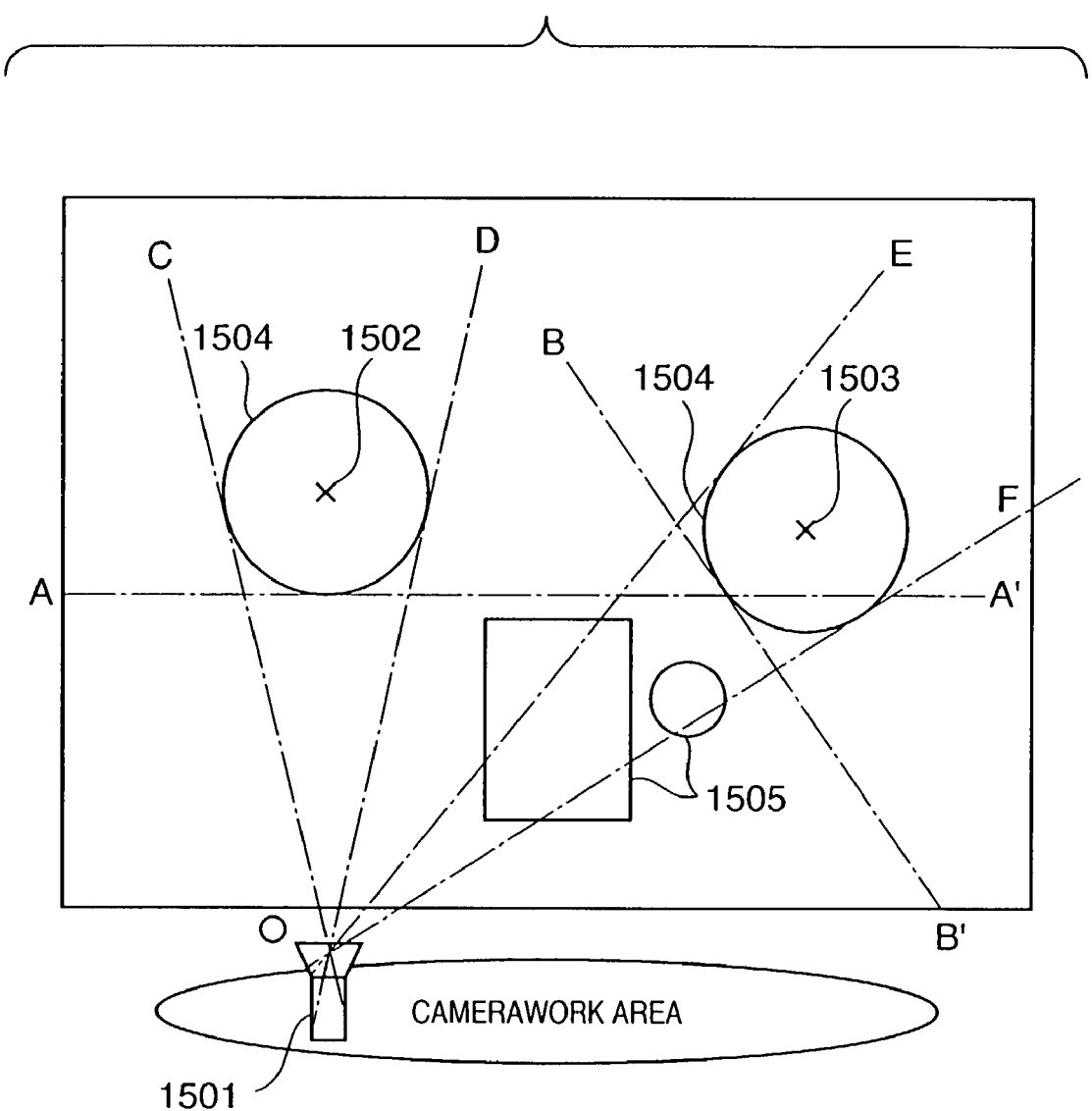
FIG. 15 shows strict prohibited regions.

FIG. 15 shows strict prohibited regions. FIG. 15 illustrates lines OC, OD, OE, and OF which run from the camera 1501 and are tangent to arcs indicating the surrounding regions 1504 of the real objects 1502 and 1503. A strict prohibited region is, for example, a sum set of the surrounding region 1504 of the real object 1502, and a region farther than the surrounding region 1504 of a region bounded by the lines OC and OD. Such prohibited region can be easily calculated by elementary mathematics in real time as long as the processing speed of the operator apparatus 110 is high enough.

Figure 16:
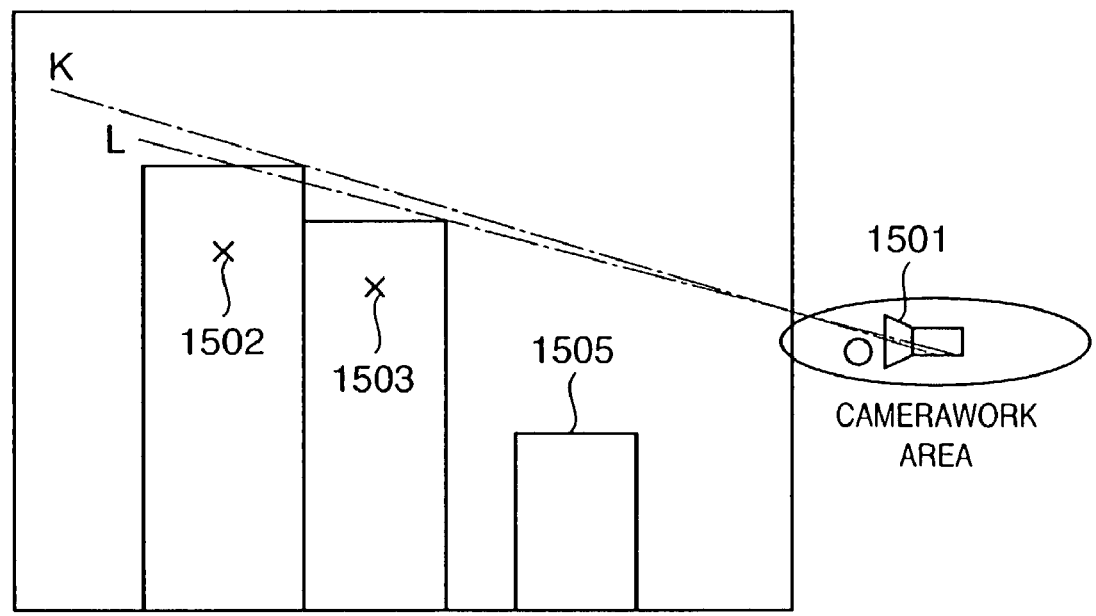
FIG. 16 is a side view of a studio to show prohibited regions.

FIG. 16 is a side view of the studio 101 to show prohibited regions. The heights of the prohibited regions can be estimated from the positions of the real objects 1502 and 1503, and region dividing lines are calculated as, e.g., lines OK and OL (in practice, planes which run in the lateral direction) which are tangent to them. In case of calculations in the up-and-down direction, a region where the real objects 1502 and 1503 are present of the two regions divided by the region dividing lines is defined as a prohibited region.

As described above, since the position of each virtual object is controlled by dynamically calculating the prohibited region, a high-quality composite picture can be obtained in a studio system in which the user experiences a composite picture of a photographed picture and CG or the like in real time.

Alternatively, in place of the real-time prohibited region process in this embodiment, the sum of all possible prohibited regions may be calculated in advance on the basis of the moving ranges of the camera and performer, and each virtual object may be controlled not to enter that region. In this way, real-time calculations may be omitted.

Second Embodiment

A mechanism that can produce a more useful utility value in a combination of the studio system explained in the first embodiment and the Internet communications that have prevailed recently will be explained below.

Figure 17:
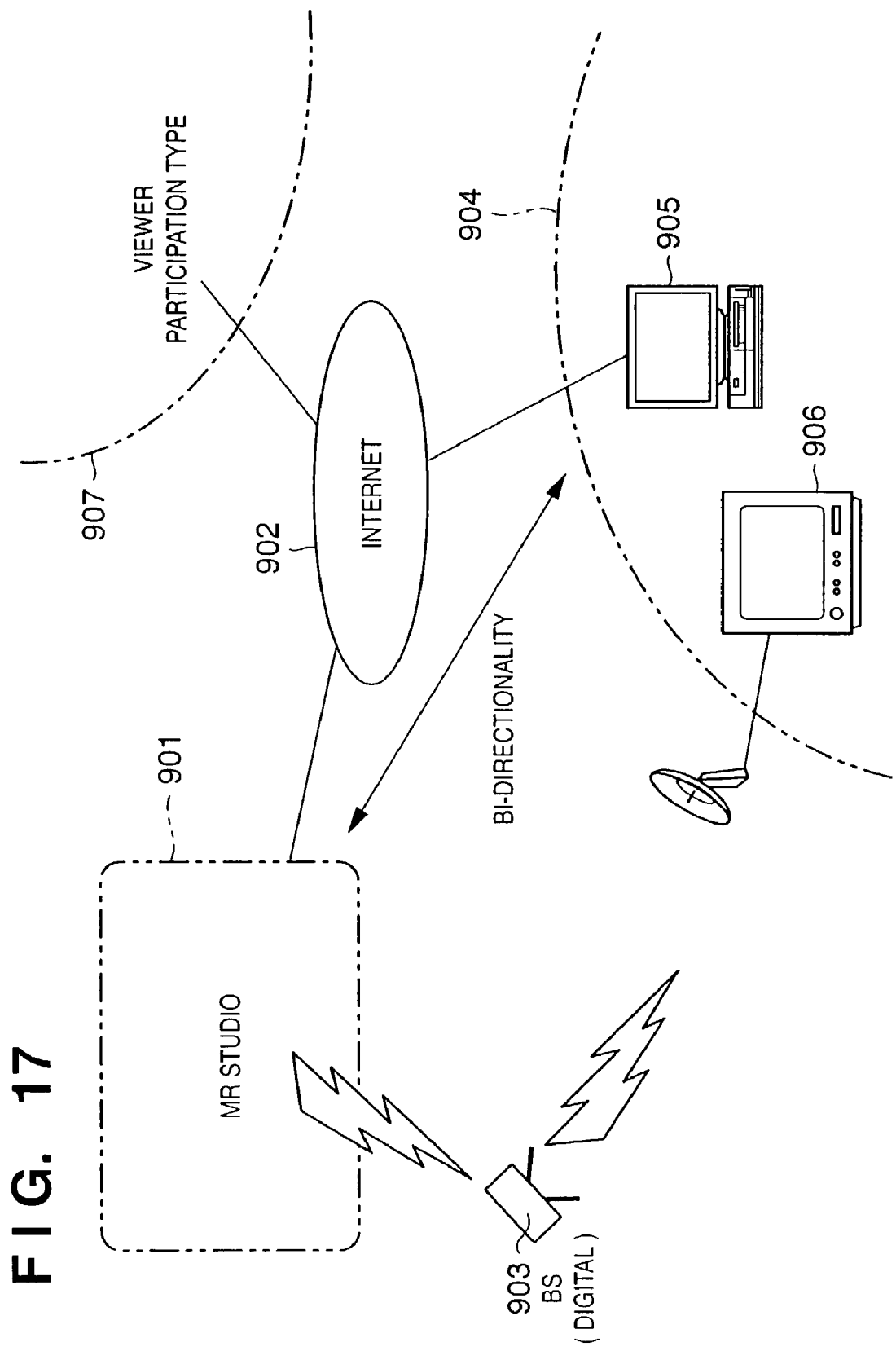
FIG. 17 shows a service environment according to the second embodiment of the present invention.

FIG. 17 shows a service environment including the photographing studio system (to be referred to as an MR studio hereinafter) described using FIG. 1. Referring to FIG. 17, reference numeral 901 denotes a studio having the image processing apparatus described using FIG. 1; 902, the Internet; 903, an artificial satellite for making satellite broadcast such as BS digital broadcast (903 may also be simply referred to as BS digital broadcast hereinafter); and 904 and 907, a general home environment or office environment. The environment 904 includes an Internet terminal 905 which comprises a PC and the like, and a digital television terminal 906 which has a satellite broadcast receiver.

Note that the Internet 902 and BS digital broadcast 903 are building components which are known to those who are skilled in the art. As for BS digital broadcast, downstream video distribution (from the studio to home) is made via the satellite, and upstream communications are made via the Internet using a cable, telephone line, or dedicated line. If the Internet allows a broadband communication, downstream video distribution can also be made via the Internet. The studio and home are interconnected via these upstream and downstream communications.

Figure 18:
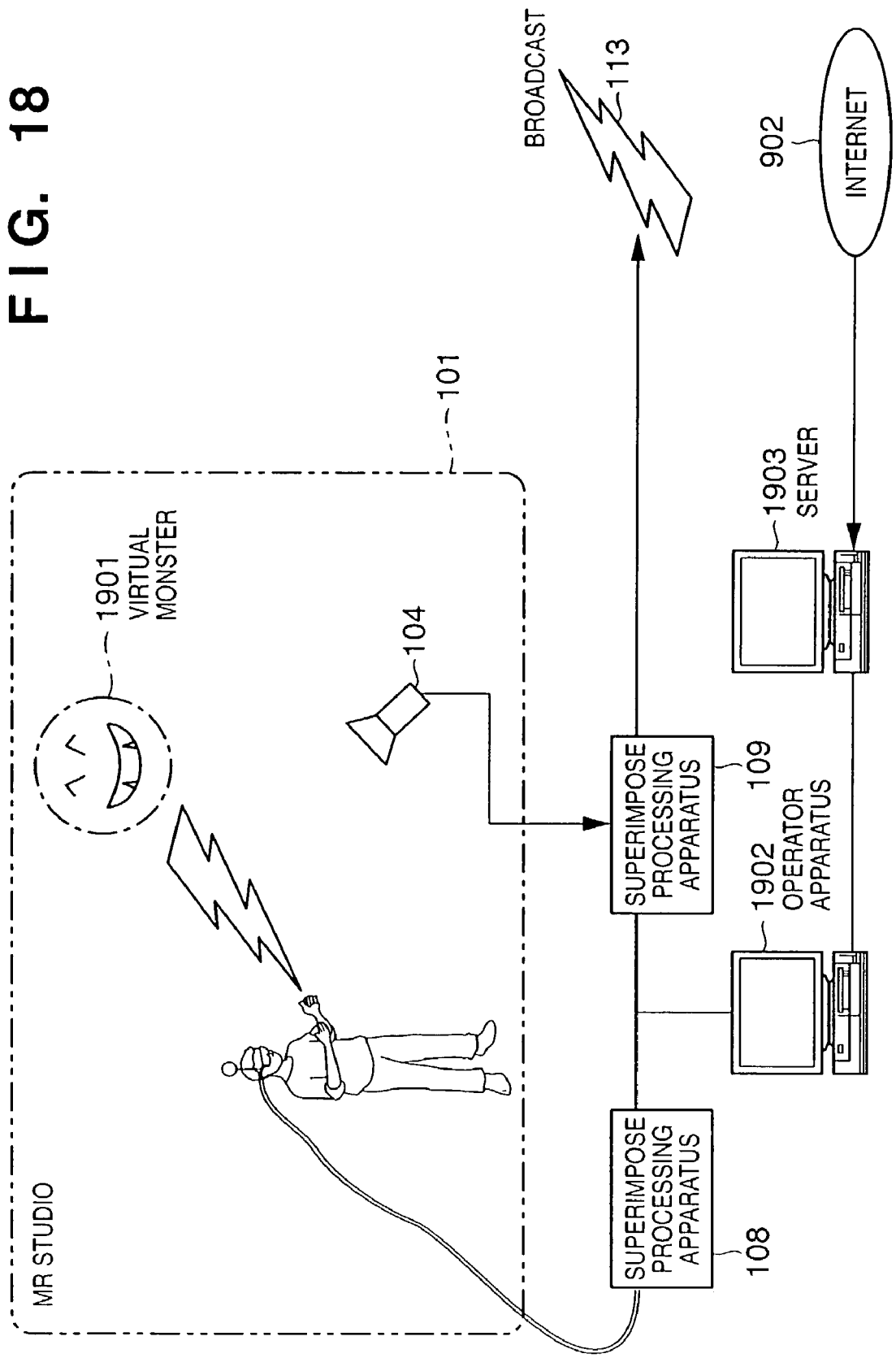
FIG. 18 is a schematic system diagram showing the arrangement of a photographing studio system to which the second embodiment of the present invention is applied.

FIG. 18 shows the arrangement of the MR studio which is connected in two ways using the Internet. Reference numeral 104 denotes a photographing device (camera); 109, a processing apparatus for superimposing a picture of a virtual object on a camera picture; 113, a broadcast means for broadcasting a composite picture generated by the MR studio; 902, the Internet; 1901, a virtual character (monster in this case) generated by CG; 1902, an operator apparatus for controlling the system state as well as the communication result from the Internet; and 1903, a server apparatus for receiving communications from the Internet.

In case of the Internet video communication, the broadcast means 113 comprises a system, which is generally known as a streaming server, and is available from, e.g., RealNetworks. In case of satellite broadcast (communication) or ground wave broadcast, the broadcast means 113 comprises a general broadcast system in the art.

As in FIG. 1, the photographing device (camera) 104 photographs a real picture of the studio, and the photographed picture data is composited with CG data by the superimpose processing apparatus 109. Composite picture data as the output of the apparatus 109 is broadcasted to end viewers as the Internet, or satellite broadcast or ground wave broadcast via the broadcast means 113. In the home of each end viewer, the broadcast is received using an Internet terminal that can establish connection to the Internet, or a BS digital broadcast terminal or digital TV terminal.

At the same time, such terminal can communicate with the server apparatus 1903 when it establishes connection to the Internet. The viewer can see the broadcasted picture, and can make operation such as clicking on a specific position on the screen by a general interactive method using a mouse, remote controller, or the like. This operation signal is transferred from the Internet terminal or the like to the server apparatus 1903, which counts such operation signals to collect reactions from the viewers. This counting process acquires information of click counts of regions, which are obtained by dividing the screen into some regions, by the viewers. The count information is transferred to the operator apparatus 1902, which manipulates the action of a CG character along a scenario in progress, parameters upon progressing a game, a CG display pattern, and the like in accordance with the count information. For example, when the transparency of a monster is manipulated in accordance with the number of viewers who instructed an appropriate divided region as the monster position, the monster can be seen more clearly by collaboration among the viewers. As another example, the power parameter of a performer (player) may increase depending on the count that the viewer presses a power button region, thus increasing a damage value to the monster.

The server apparatus 1903 has the same arrangement as a server apparatus generally known as a Web server. More specifically, the server apparatus 1903 accepts an input from a terminal, which serves as a client, as a server side script using CGI, Java, or the like.

Figure 19:
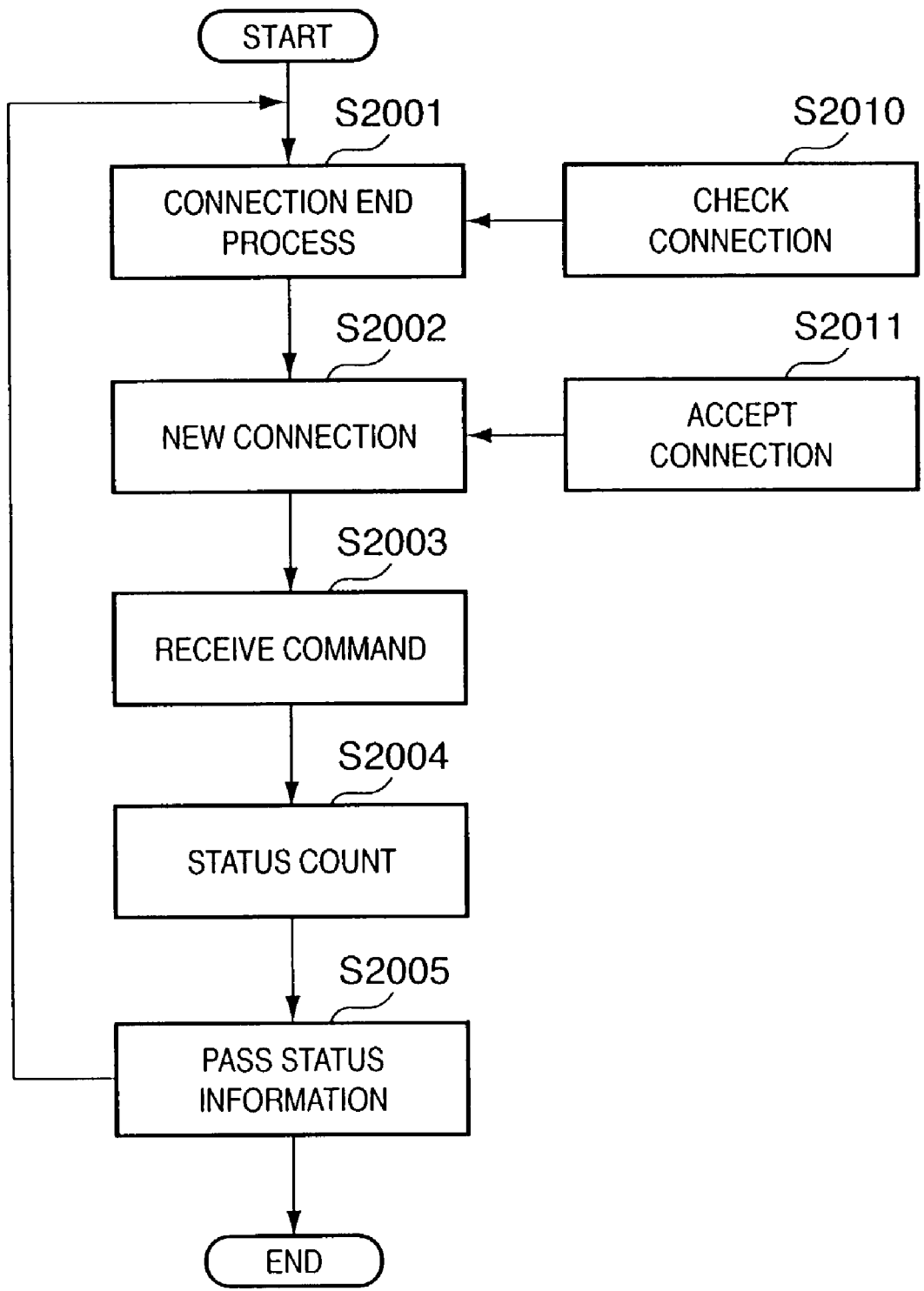
FIG. 19 is a flow chart showing the process of a server apparatus in the second embodiment of the present invention.

FIG. 19 is a flow chart showing the process of the server apparatus 1903. A connection check process (thread S2010) that holds connection via the network, and a new connection reception process (thread 2011) are programmed to run parallelly as threads independent from the flow of the main processing.

The server apparatus 1903 receives the status data of the currently established connections from connection check thread S2010, and executes a connection end process for cleaning up internal status data (step S2001) if connection is disconnected. A new connection request is received from connection reception thread S2011, and if a new connection request is detected, new connection is established (step S2002). Then, commands are received from all connections (step S2003). The command format in this case is [ClickAt N], where N indicates the number of a divided region. These commands are counted for respective divided region numbers N (step S2004), and count values for respective divided region numbers N are passed as status information to the operator apparatus 1902 (step S2005).

Figure 20:
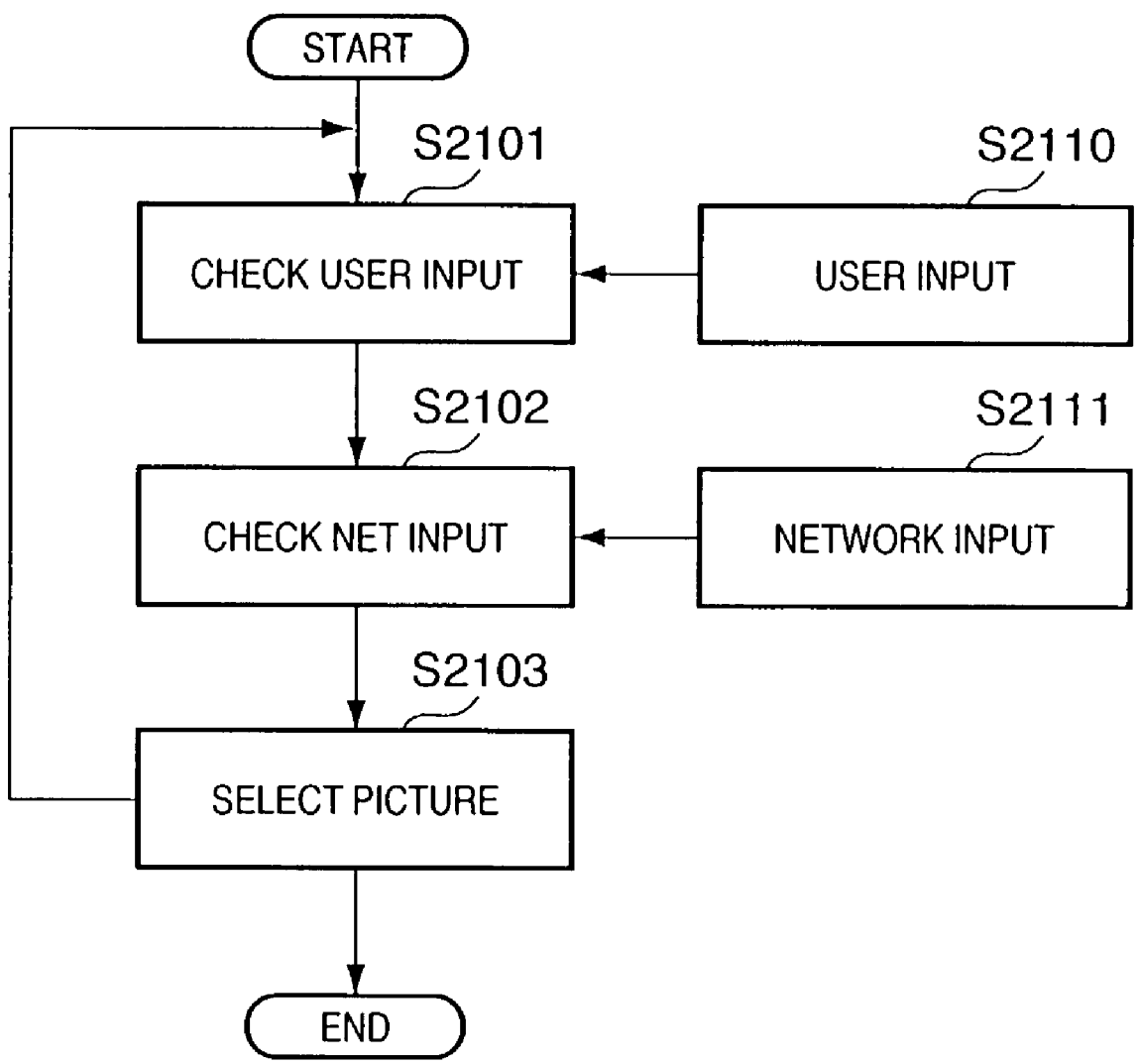
FIG. 20 is a flow chart showing the process of an operator apparatus in the second embodiment of the present invention.

FIG. 20 is a flow chart showing the process of the operator apparatus 1902 corresponding to the process of the server apparatus 1903 shown in FIG. 19.

The operator apparatus 1902 receives user's operation input (step S2101), receives server status information (count values for respective regions) from the server apparatus 1903 by a communication via the network (step S2102), and updates internal status values (scenario progress pointer, display mode, and the like) in accordance with the received information (step S2103).

In this case, for example, when the operator apparatus 1902 manipulates the transparency of a monster in accordance with the number of viewers who instructed an appropriate divided region as the monster position, the monster can be seen more clearly by collaboration among the viewers.

After the process in step S2103, as in the process of the operator apparatus 110 in the first embodiment shown in FIG. 12, the prohibited region may be determined based on the position information of the camera and performer, the position data may be updated to inhibit a virtual CG object from entering this region, and the updated status information may be sent to the superimpose processing apparatuses 108 and 109.

As described above, according to the second embodiment, a novel viewer-performer simultaneous experience type system in which operations from the viewers in their home are received using two-way communications via the Internet and are reflected in a scenario or operation/display parameters and the like so as to damage and fight off a monster rendered using CG by the viewers and performer in the studio together is realized.

When HMD devices and the like corresponding to an audience space appended to the studio environment are prepared, and a motion control camera is prepared, the service environment using the MR studio can be expanded to provide a mixed reality picture experience using a real-time composite picture of a CG and actually shot image to various users: (1) a user who enjoys as a performer in the MR studio; (2) a staff member who makes camerawork in the studio (or a user who acts as a staff member); (3) a user as audience who simultaneously experiences in the studio; (4) a user who only watches via the Internet or satellite broadcast; (5) a user who acts as a virtual character in the MR studio in practice to join a battle or cooperatively participates in a play in the MR studio; (6) a user who is engaged in camerawork or editing in the MR studio via the Internet; and the like.

Third Embodiment

The third embodiment realizes, for example, a collaborative application pattern like a three-legged race by assigning viewers to a plurality of virtual characters or a plurality of parts which form a virtual character, and moving the virtual character or producing an effect on a scenario by collaboration among the plurality of parts in a viewer participation system via the network (Internet) as in the second embodiment.

Figure 21:
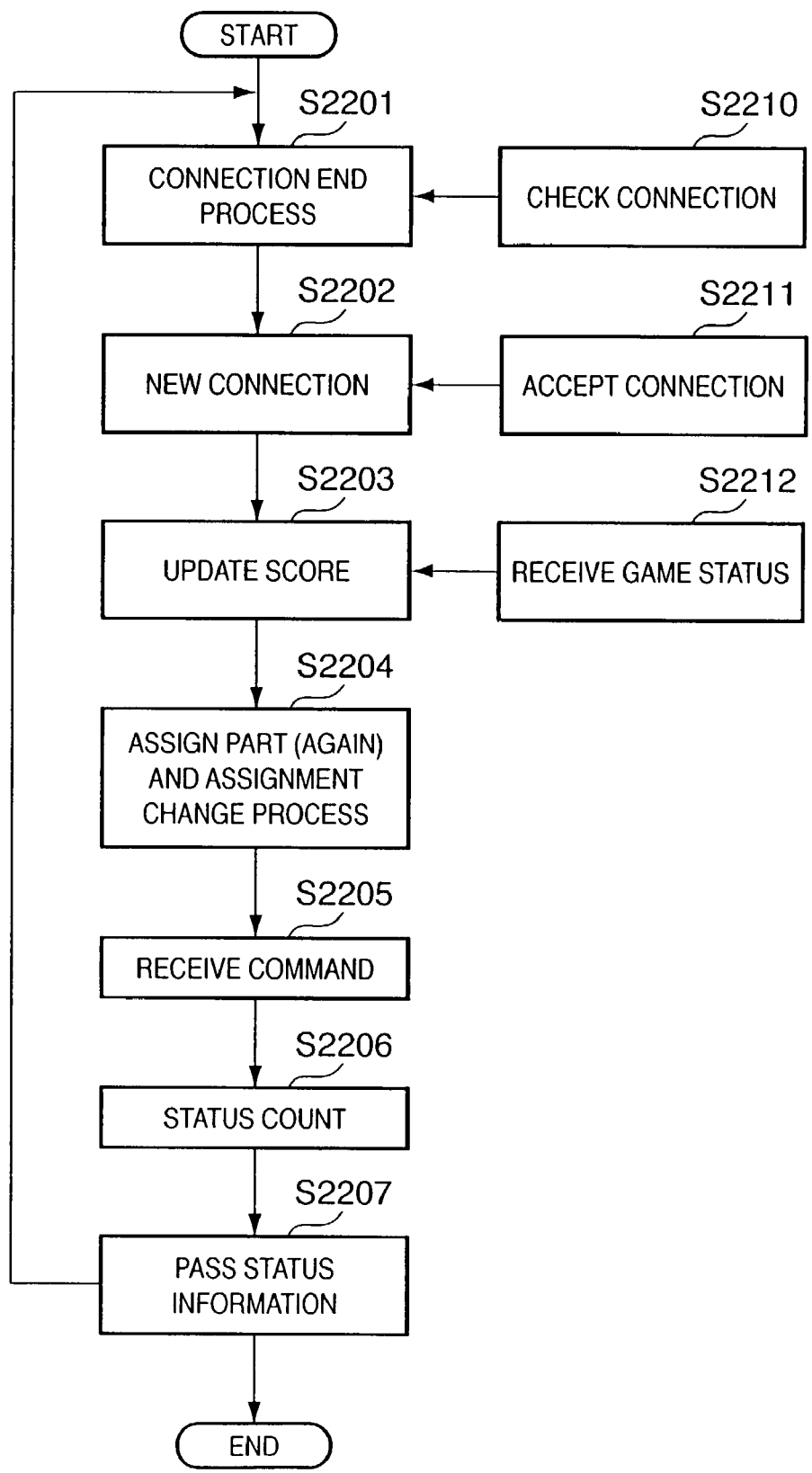
FIG. 21 is a flow chart showing the process of a server apparatus in the third embodiment of the present invention.

FIG. 21 is a flow chart showing the process of the server apparatus 1903 in such case. A part assignment process and the like are added to the flow chart in FIG. 19, and assume that a game is scenario contents. The game status reception process in thread S2212 is a thread for receiving scores of respective parts depending on the game progress state according to manipulations of the operator apparatus 1902 from the operator apparatus 1902.

This thread S2212, thread S2210 for executing a connection check process that holds connection via the network, and thread S2211 for executing a reception process of new connection are programmed to run parallelly as threads independent from the flow of the main processing.

The server apparatus 1903 receives the status data of the currently established connections from connection check thread S2210, and executes a connection end process for cleaning up internal status data (step S2201) if connection is disconnected. A new connection request is received from connection reception thread S2211, and if a new connection request is detected, new connection is established (step S2202). Then, scores along with the progress of the game are received from game status reception process thread S2212 to update scores corresponding to respective connections (step S2203).

Note that respective connections are grouped by part numbers assigned to them, and have previous input data as their values. From the operator apparatus 1902, the server apparatus receives a set of a part number that has scored, an input value which contributes to the score, and the score to be added. The server apparatus 1903 increases a score value by the score to be added with respect to a connection that matches the set of part number and input value.

Then, a part number is assigned to a new connection, to which no part (part number) is assigned yet, of the connections, and another part is re-assigned to a connection whose score has reached a specific value (step S2204). As rules for assigning parts to connections, an unimportant end part is assigned initially, and every time the score has reached a specific value, the assigned part shifts to a more important one (e.g., from a leg to a hand or head).

Then, commands are received from all connections (step S2205). The command format in this case is [ClickAt N], where N indicates the number of a divided region. These commands are counted for respective part numbers M of individual connections and divided region numbers N (step S2206), and count values for sets of M and N are passed as status information to the operator apparatus 1902 (step S2207).

Figure 22:
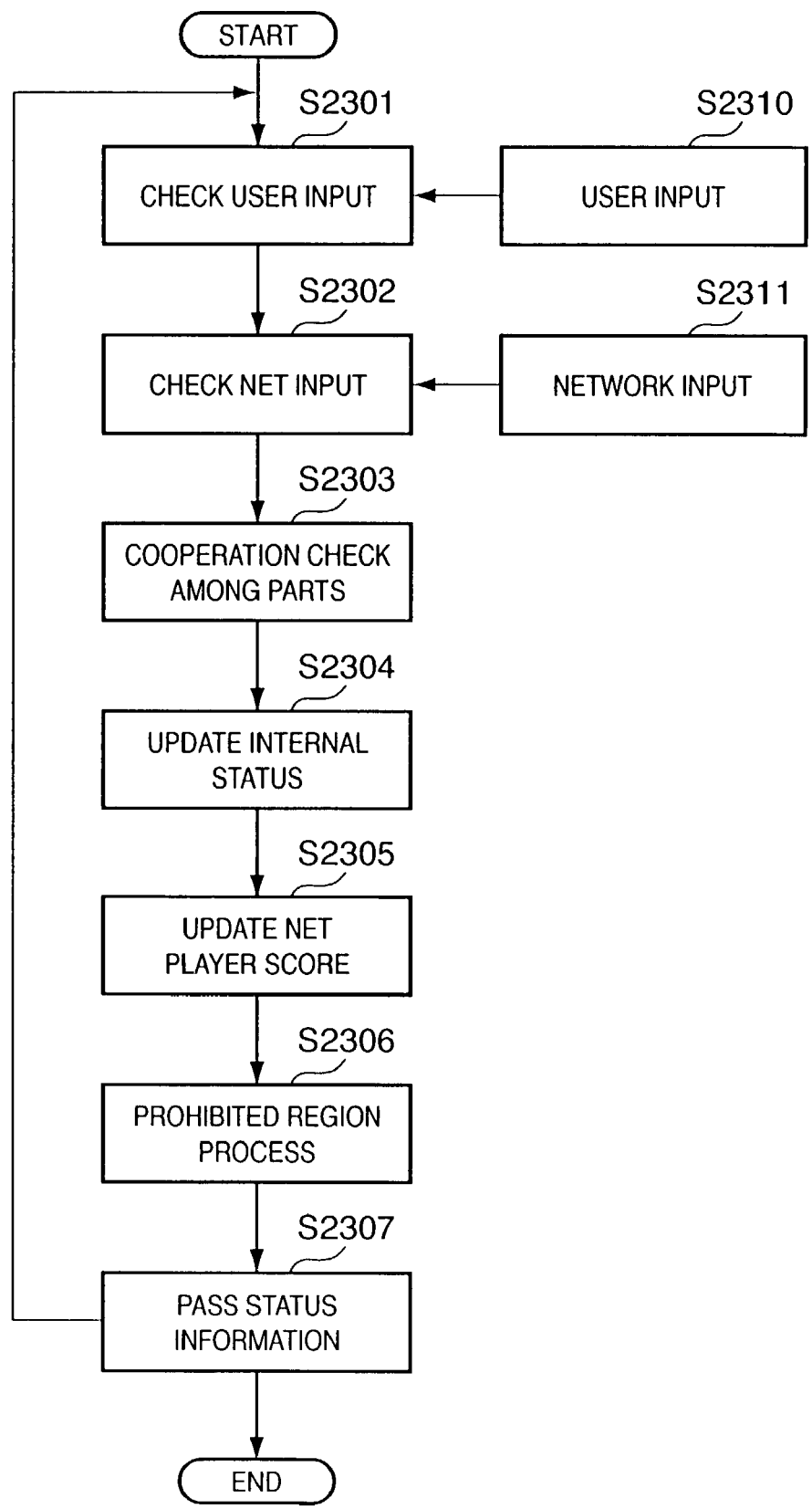
FIG. 22 is a flow chart showing the process of an operator apparatus in the third embodiment of the present invention.

FIG. 22 is a flow chart showing the process of the operator apparatus 1902 corresponding to the process of the server apparatus 1903 in FIG. 21.

The operator apparatus 1902 receives user's operation input (step S2301), and receives status information (count values for respective regions of respective parts) from the server apparatus 1903 via the network (step S2302).

Then, a region with the largest count value of each part is used as a change parameter, and cooperation among parts is checked to check consistency of a change among parts (step S2303). The operator apparatus 1902 updates internal status values (scenario progress pointer, display mode, and the like) in accordance with such information (step S2304). If a plurality of parts have brought about a change with consistency, for example, if a leg has moved in the three-legged race, it is determined that an action with a merit has been made; otherwise, it is determined that an action without a merit or no operation has been made. In this way, the work can progress by collaboration among viewers.

Scores are given to respective parts in accordance with the game progress internal status data and actions (step S2305). The prohibited region is determined based on the position information of the camera 104 and performer, and the position data is updated to inhibit a virtual CG object from entering this region (step S2306). The updated status information is sent to the superimpose processing apparatuses 108 and 109, and sets of part numbers that have scored, divided region numbers, and scores are sent to the server apparatus 1903 (step S2307).

As described above, according to the third embodiment, operations from viewers in their home are received using two-way communications via the Internet, and parts are assigned to respective connections, thus allowing the viewer to enjoy a collaboration of a plurality of parts.

As a process associated with the collaboration, when the relationship between the user input and network input is checked, collaboration between the viewer via the network and a player who experiences in the studio can be added.

Fourth Embodiment

In the second and third embodiments, a plurality of viewers simultaneously participate in a game via the network. However, it is appropriate for some content that one viewer solely participates. In such case, by making connection management (connection limitation management) upon reception of connection from the network, a specific viewer solely plays for a while (e.g., a predetermined period of time), and another viewer then plays.

Figure 23:
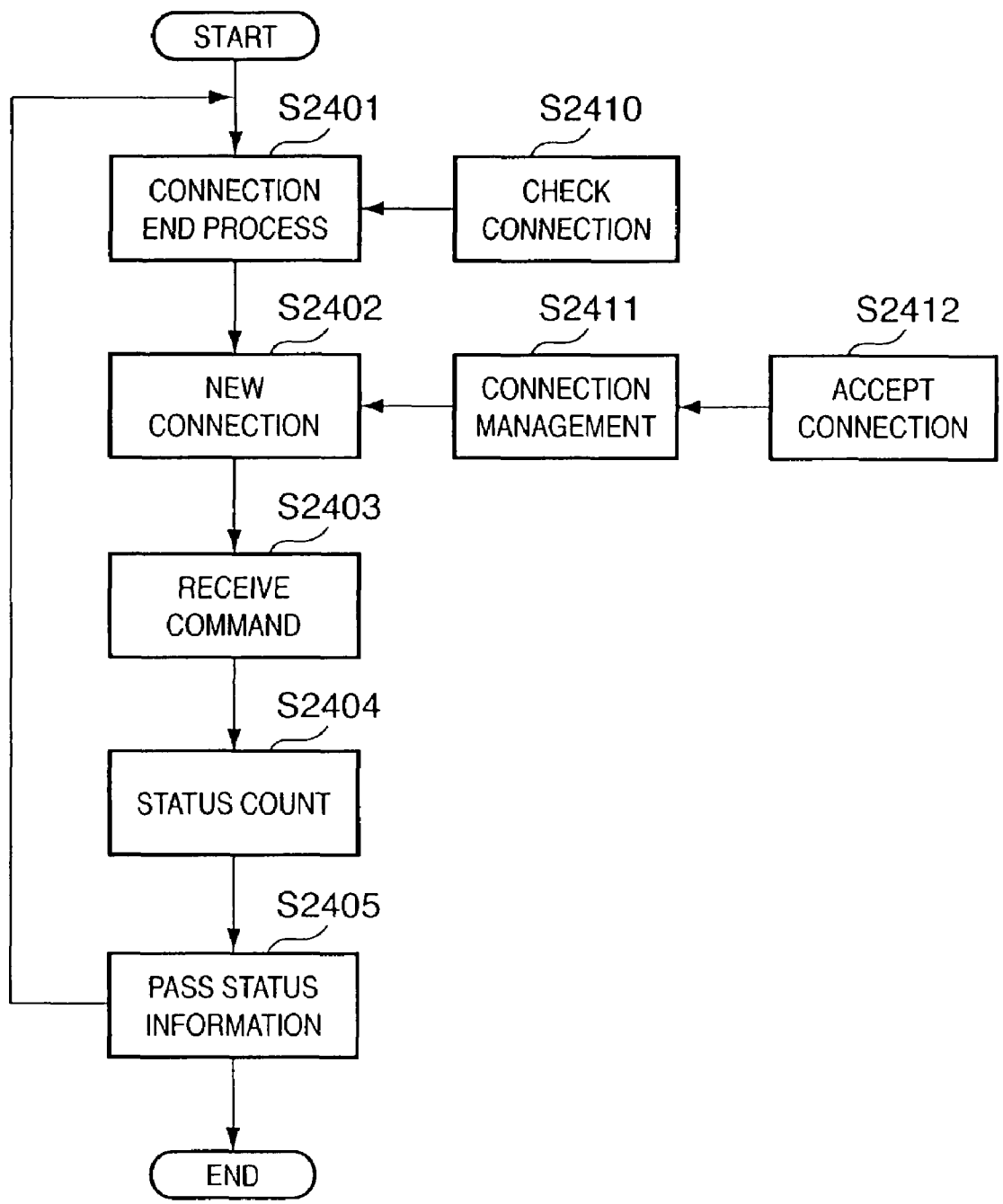
FIG. 23 is a flow chart showing the process of a server apparatus in the fourth embodiment of the present invention.

FIG. 23 is a flow chart showing the process of the server apparatus 1903 upon executing such process. In FIG. 23, a connection limitation management process of thread S2411 is added to the flow in FIG. 19.

Note that various connection limitation management methods may be used. In this embodiment, a viewer inputs an ID code, and primary screening is done to check if the input ID code is recorded in a list of a series of ID codes which are granted permission. One of viewers who have passed primary screening is randomly selected, and allowed to play for a predetermined period of time (e.g., 3 min). After an elapse of the predetermined period of time, another one of the viewers who have passed primary screening is randomly selected, and this process is repeated. If no input from the selected viewer is made for a predetermined period of time (e.g., 5 sec), the next viewer is automatically selected.

When the ID code is adhered to a game product or the like associated with broadcast content, or is distributed as a gift of some product, it can be used to improve incentives upon purchasing a product. The ID code is designed to have digits that can express codes much larger than the actually distributed quantity, and contention to codes that general viewers are likely to input can be avoided. Furthermore, by informing codes which can be used in broadcast, idle waiting times of viewers can be reduced.

As described above, in the fourth embodiment, the server apparatus 1903 limits viewers who participate in the game in consideration of the contents of the game or the like, thus achieving new merits beyond a simple game play.

Fifth Embodiment

The fifth embodiment uses a game product associated with broadcast, and allows the user to experience in an MR studio using data of a character which has been grown using a game product in his or her home.

In such game product, character data is handled as a set of character type and numerical values or codes indicating its parameters. Hence, by providing a function of exchanging the character data, and a scenario management function and CG data management function which run using the received data, the character data that has been grown using the game product in the home can be utilized.

Figure 24:
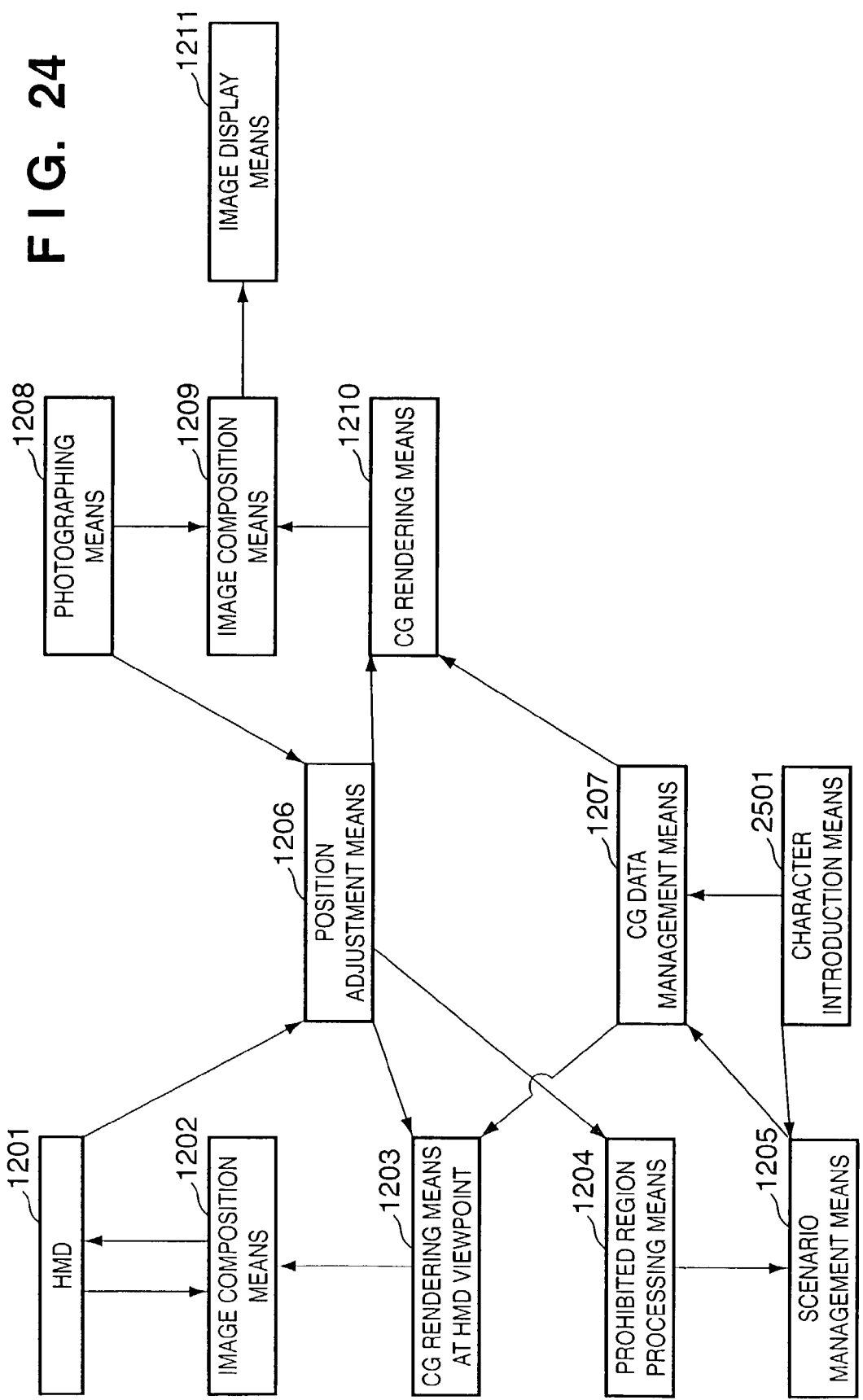
FIG. 24 is a schematic system diagram showing the arrangement of a photographing studio system to which the fifth embodiment of the present invention is applied.

FIG. 24 shows the arrangement of such system.

A character introduction means 2501 reads out character data from a memory medium such as a floppy disk or the like, and supplies the readout data to a scenario management means 1205 and CG data management means 1207. The character data includes the character type, parameters which influence the behavior of the character such as a power, defense, intelligence, and the like, and parameters which influence the appearance of the character such as a CG model ID, level, color, and the like. The former parameters are mainly set in the scenario management means 1205, and the latter parameters are mainly set in the CG data management means 1207.

The actions themselves of the character are the same as in those of a general CG or game program in the art. That is, a CG scene is generated based on the input parameters, scenario, user inputs, and the like to obtain appropriate CG expression, and internal status data are simultaneously updated to reflect the generated scene.

As described above, in the fifth embodiment, since a character introduction function is added to the system which forms the MR studio, a character which has been played and grown in the home can be used in the MR studio, and the user can experience a play in the same space as the character that he or she has grown.

Sixth Embodiment

The sixth embodiment generates picture data at multi-viewpoints, i.e., at the viewpoints of the photographing camera and performer, that the user can enjoy later via a Web, parallel to the photographing/picture creation processes in the MR studio, and provides a new use method of the MR studio.

The function of generating pictures at the viewpoints of the photographing camera and performer is the same as that which has already been explained in the first embodiment. In this embodiment, picture data obtained at different viewpoints have nearly the same time codes, and the user can enjoy pictures at nearly the same timings and different viewpoints later.

Figure 25:
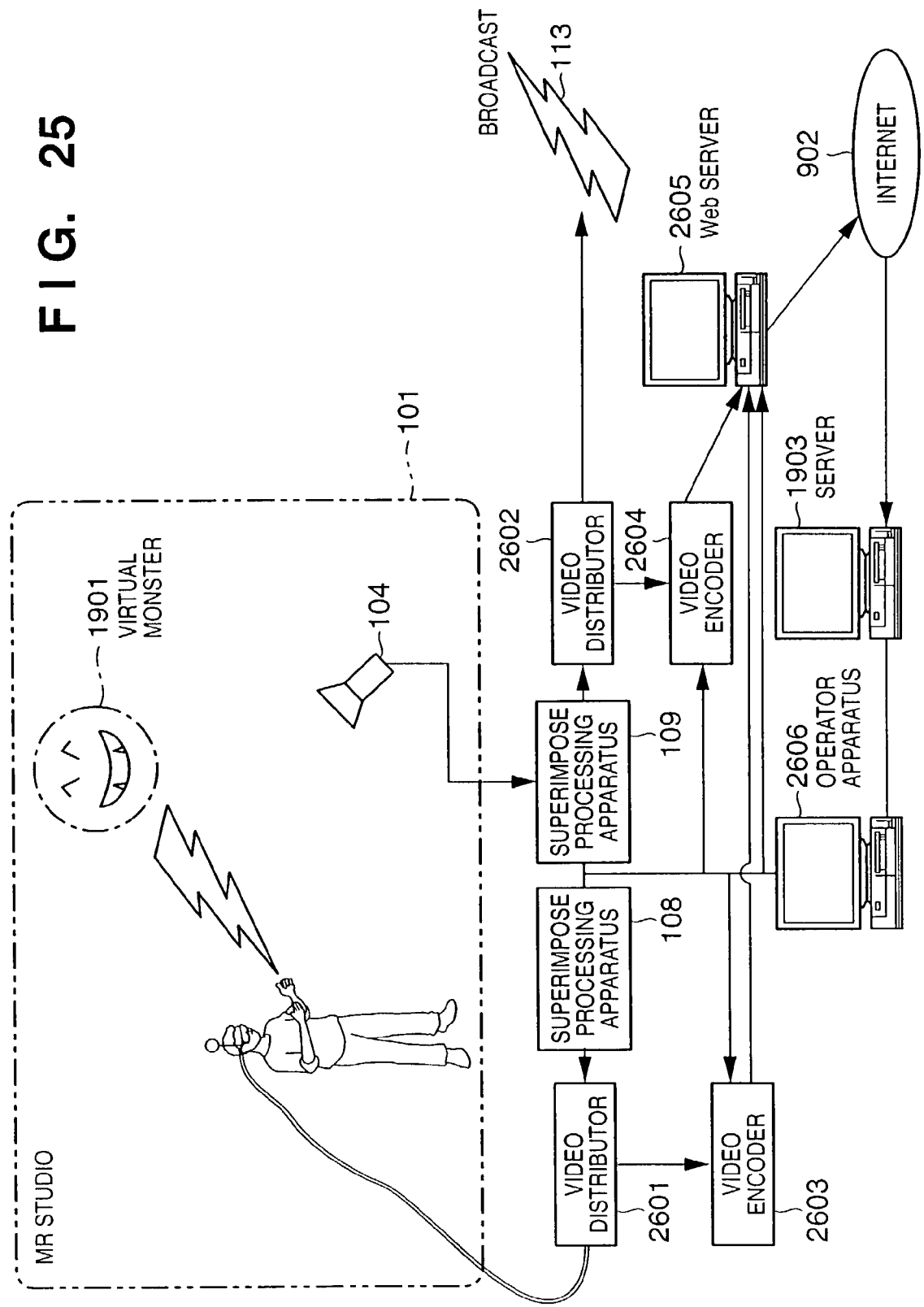
FIG. 25 is a schematic system diagram showing the arrangement of a photographing studio system to which the sixth embodiment of the present invention is applied.

FIG. 25 shows the arrangement of this embodiment, and video distributors 2601 and 2602, video encoders 2603 and 2604, and a Web server 2605 are added to the arrangement shown in FIG. 18.

The video distributor 2601 distributes a picture to be sent to the HMD 105 of the performer, and sends it to the video encoder 2603. Likewise, the video distributor 2602 distributes a picture to be sent to the broadcast means 113, and sends it to the video encoder 2604.

An operator apparatus 2606 remote-controls the video encoders 2603 and 2604 to instruct start/end of encoding. Also, the operator apparatus 2606 transfers as files the data generated by the video encoders 2603 and 2604 via the network, and uploads them to the Web server 2605.

Figure 26:
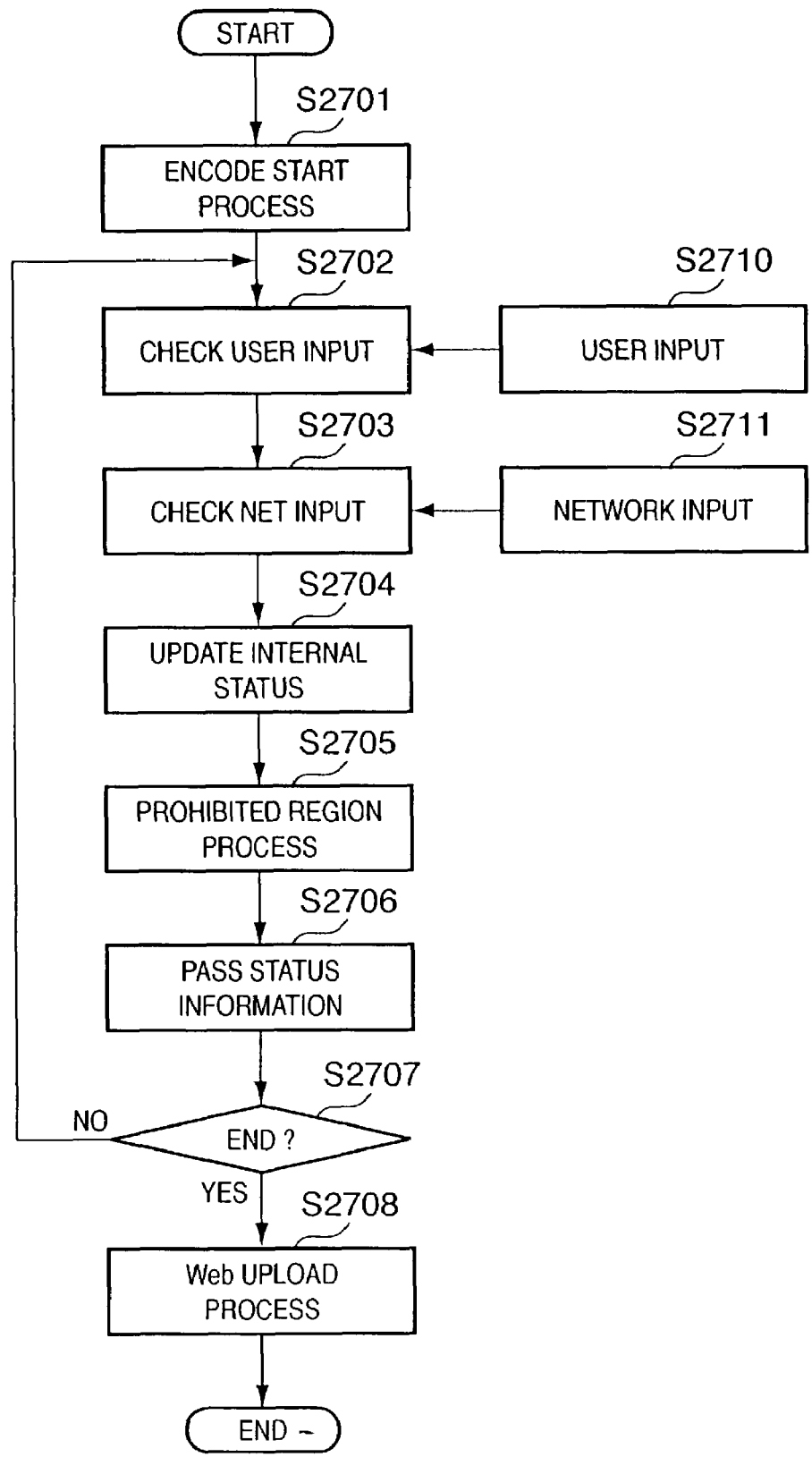
FIG. 26 is a flow chart showing the operation of an operator apparatus in the sixth embodiment of the present invention.

FIG. 26 is a flow chart showing the process of the server apparatus 2606 in this embodiment.

The operator apparatus 2606 sends an encode start command to the video encoders 2601 and 2604 via the network upon launching a game (step S2701). In this case, communications to these encoders are made time-serially, but are processed at nearly the same timings for a person.

After that, the operator apparatus 2606 receives user's operation input (step S2702), and then receives status information (count values for respective regions of respective parts) of the server apparatus 1903 from it via the network (step S2703).

The operator apparatus 2606 updates internal status data (scenario progress pointer, display mode, and the like) in accordance with such information (step S2704). The operator apparatus 2606 determines a prohibited region based on the position information of the camera 104 and the like, and updates position data of each virtual CG object so as not to enter that region (step S2705). The operator apparatus 2606 then sends the updated status information to the superimpose processing apparatuses 108 and 109 (step S2706).

The operator apparatus 2606 then checks if the game has ended (step S2707). If the game has not ended, the flow returns to step S2702; otherwise, the operator apparatus 2606 transfers as files the data generated by the video encoders 2603 and 2604 via the network, and uploads them to the Web server 2605 (step S2708).

Each video encoder can be started by calling a remote procedure which is general in network programming. The Web upload process is done by transferring files to the Web server 1903 from the video encoders 2603 and 2604 via the operator apparatus 2606.

As in the first embodiment, original picture data obtained from the photographing means (or HMD) and position/posture data of the photographing means (or HMD) may be parallelly used. In such case, a video encoder for original picture data is added, and the position/posture data is saved as a digital data file by the superimpose processing apparatus 108 or 109, thus generating data that can be used in post-production. By updating such data associated with the original picture to the Web server as in the aforementioned composite picture, both the data that can be used in post-production, and the composite picture at that site can be used via the Internet.

As described above, in the sixth embodiment, a picture at the photographing viewpoint of the camera and that at the performer are recorded at nearly the same timings, and can be browsed later via the Internet. This means that experience data which are very important for the performer and his or her friends can be downloaded from the home later.

Seventh Embodiment

The seventh embodiment can display a virtual advertisement as one pattern of virtual objects in a CG picture.

Figure 27:
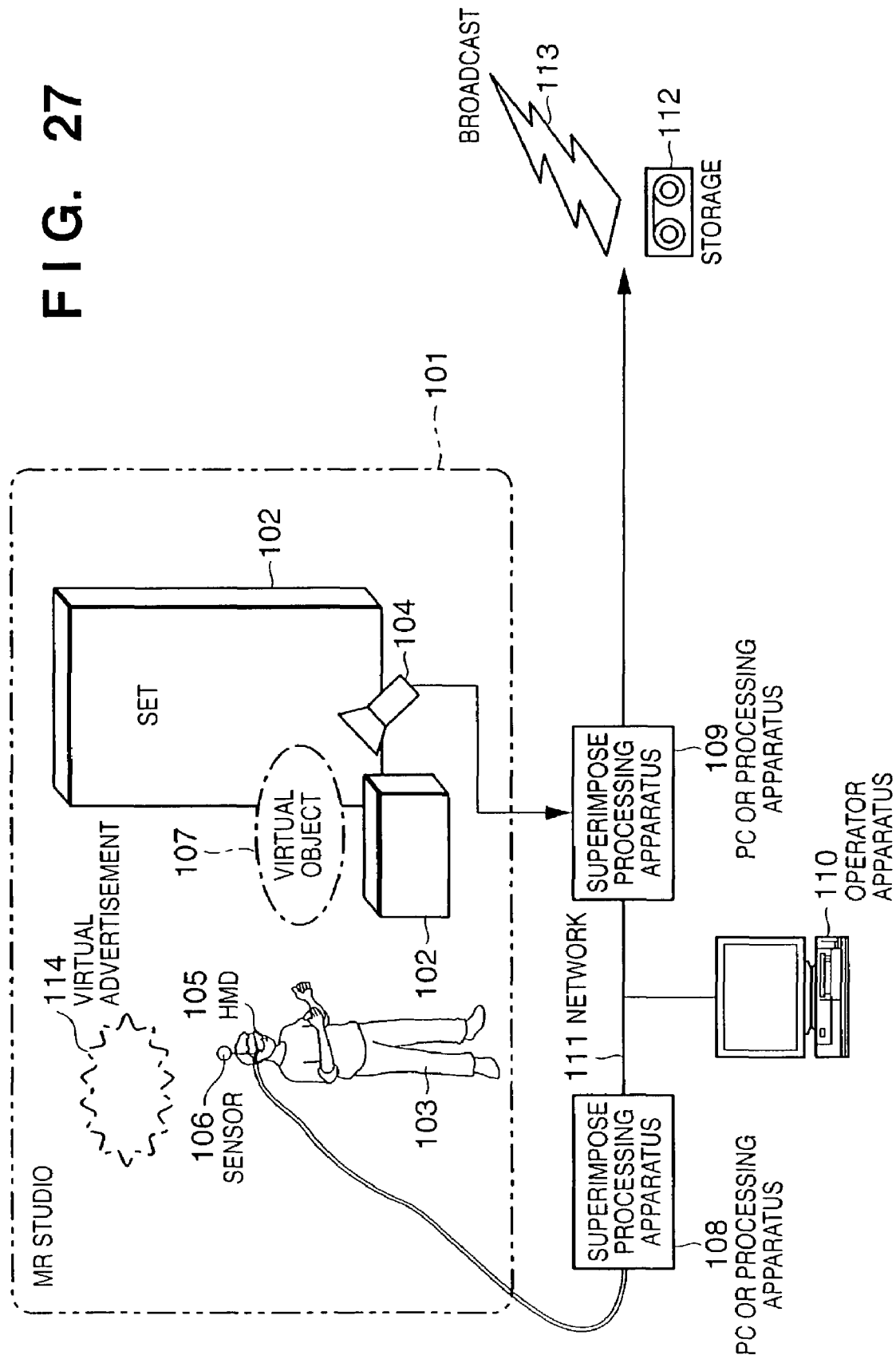
FIG. 27 is a schematic system diagram showing the arrangement of a photographing studio system to which the seventh embodiment of the present invention is applied.

FIG. 27 is a schematic system diagram showing the arrangement of a photographing studio system to which the seventh embodiment is applied. The system shown in FIG. 27 is substantially the same as that in the first embodiment, except that a virtual advertisement 114 is displayed in a CG picture.

Figure 28:
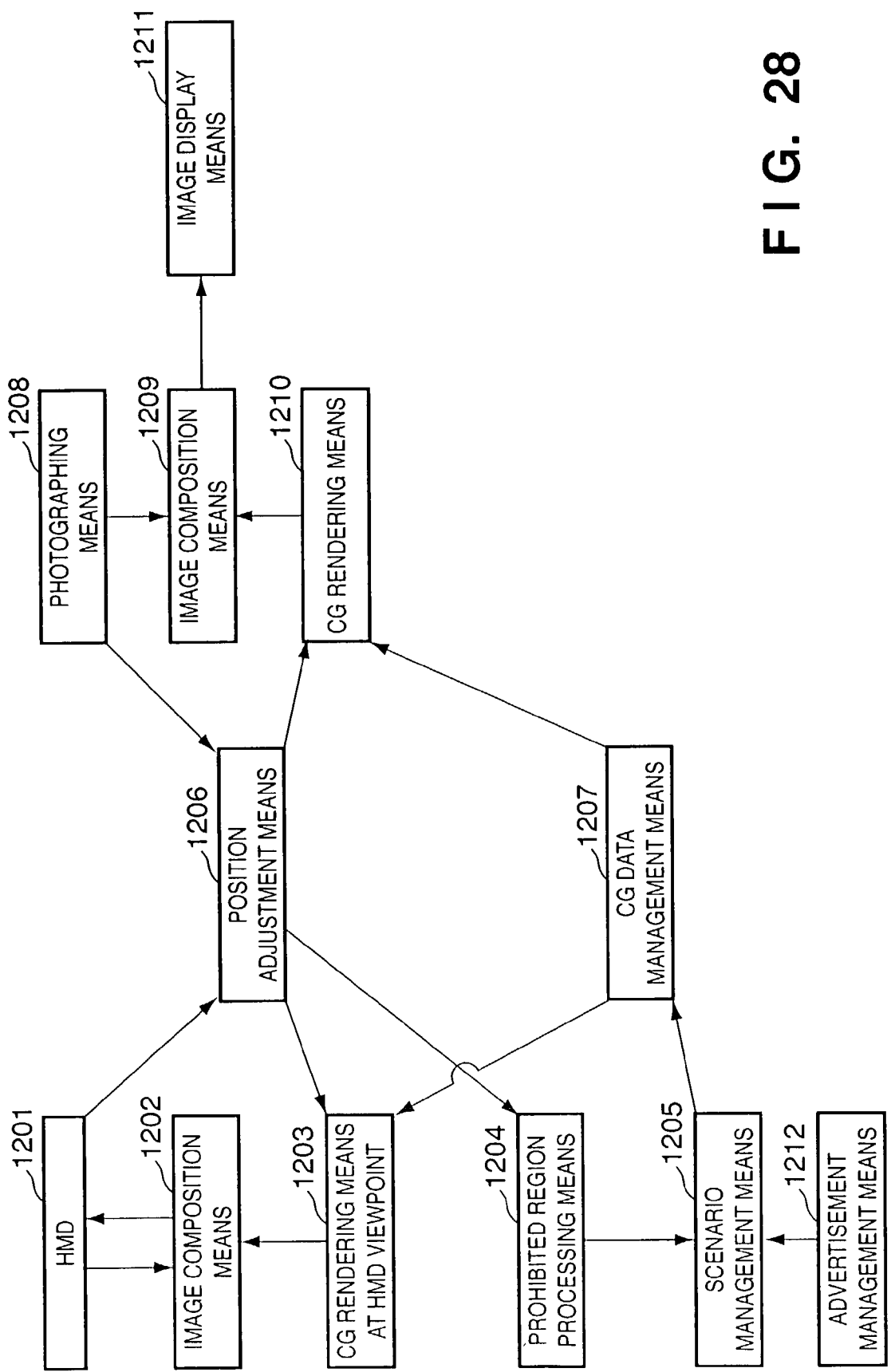
FIG. 28 is a functional block diagram showing the functions of the system shown in FIG. 27.

FIG. 28 is a functional block diagram showing the functions of the system shown in FIG. 27.

Reference numeral 1201 denotes an HMD which has a so-called see-through function, and comprises an image sensing unit and image display unit. Reference numeral 1202 denotes an image composition means; 1203, a CG rendering means at the HMD viewpoint; 1204, a prohibited region processing means for controlling the existence range of a CG object; 1205, a scenario management means; 1206, a position adjustment means including a position sensor and the like; 1207, a CG data management means; 1208, a photographing means such as a camera or the like; 1209, an image composition means; 1210, a CG rendering means; 1211, an image display means; and 1212, an advertisement management means.

An image sensed by the HMD 1201 is composited with a CG image generated by the CG rendering means 1203 by the image composition means 1202, and that composite image is displayed on the HMD 1201. An image sensed by the HMD 1201 is also sent to the position adjustment means 1206, which calculates the position/direction of the HMD (i.e., the head) on the basis of that image and tracking information obtained from a position sensor or the like, and sends the calculated information to the CG rendering means 1203. The CG rendering means 1203 renders a CG image at the HMD viewpoint on the basis of the position/direction information of the head obtained by the position adjustment means 1206 and CG data obtained from the CG data management means 1207.

The scenario management means 1205 sends information required for a scene configuration to the CG data management means 1207 in accordance with information obtained from the prohibited region processing means 1204, the progress of a rehearsal or action or operator's instructions, and the like, and the CG data management means 1207 instructs the CG rendering means 1203 or 1210 to render a CG image in accordance with the received information.

The same applies to a process for an image obtained by the photographing means 1208. That is, an image sensed by the photographing means 1208 is composited with a CG image generated by the CG rendering means 1210 by the image composition means 1209, and the obtained composite image is displayed on the image display means 1211. An image sensed by the photographing means 1208 is also sent to the position adjustment means 1206, which calculates the position/direction of the photographing means (i.e., a camera) on the basis of that image and tracking information obtained from a position sensor or the like, and sends the calculated information to the CG rendering means 1210.

The CG rendering means 1210 renders a CG image at the camera viewpoint on the basis of the position/direction information of the head obtained by the position adjustment means 1206 and CG data obtained from the CG data management means 1207. The position adjustment means 1206 sends the calculated position/direction data of the HMD (i.e., the head) and the position/direction data of the photographing means (i.e., the camera) to the prohibited region processing means 1204, which determines a range where a CG object is to exist, on the basis of these position/direction data, and the scenario management means 1205 corrects the position of the CG object in accordance with the range where the CG object is to exist.

Information required for CG rendering, which is managed by the scenario management means 1205 includes the number of a CG model to be displayed, reference position/posture data, the number indicating the type of action, parameters associated with the action, and the like for each individual character to be displayed. A scenario is managed for each scene, and the aforementioned data set is selected in accordance with the status values of each character such as a power, state, and the like, the operation input from the operator, the action of the performer, and the like in each scene. For example, the number of a CG model to be displayed is determined based on the randomly selected type of character and the power value (which increases/decreases by points with the progress of a game) of that character.

The operator inputs information associated with movement, rotation, and the like of the character, and the reference position/posture data is determined based on that input information. The position, posture, and status value of the character, and the position, posture, and action of the performer in this case determine the action and parameters of the character. Note that the position and posture are corrected by a prohibited region process.

Note that the see-through function of the HMD 1201 can also be implemented by arranging the HMD to allow the user to see through the external field (optical see-through scheme). In this case, the aforementioned image composition means 1202 is omitted.

The scenario management means 1205 stores information such as a script, lines, comments, and the like required to help actions, and advertisement information received from the advertisement management means 1212, and sends required information to the CG data management means 1207 in accordance with a scene. The CG data management means 1207 instructs the CG rendering means 1203 and 1210 to execute a rendering process according to such information. A scene progresses using an arbitrary user interface (mouse, keyboard, voice input, or the like).

The advertisement management means 1212 stores advertisement information of a sponsor, and sends required advertisement information to the scenario management means 1205 in accordance with each scene. This advertisement information is sent from the scenario management means 1205 to the CG rendering means 1210, thus generating an advertisement image as a CG image. This advertisement image is composited with an actually photographed picture by the image composition means 1209, and the composite picture is displayed by the image display means 1211.

Figure 29:
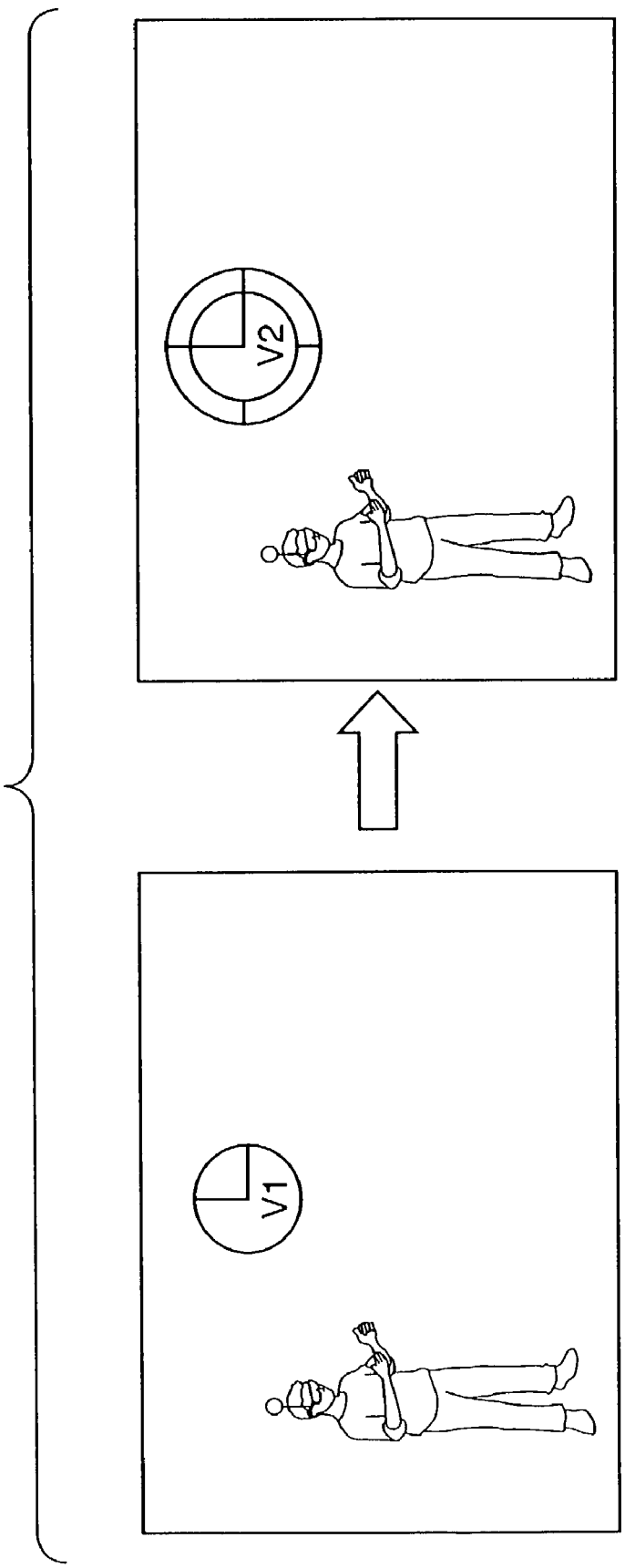
FIG. 29 shows an example of an advertisement as a virtual object using CG.

For example, if a timepiece manufacturer is a sponsor, a virtual advertisement is displayed, as shown in FIG. 29. Note that a studio set and the like are not illustrated in FIG. 29. In FIG. 29, a performer as a real object is displayed on the left side of the screen, and a timepiece as a virtual advertisement is displayed at the center of the screen.

Initially, a timepiece with model number V1 is displayed as the virtual advertisement. Upon switching the screen contents, along with the progress of a scenario, or the like, that timepiece can be changed to a timepiece with model number V2 or the like. The virtual advertisement can undergo the prohibited region process and display and move instructions upon operation of the operator apparatus 110 as in other virtual objects. Various kinds of control associated with the virtual advertisement are made by the advertisement management means 1212.

As described above, according to the seventh embodiment, a virtual CG advertisement can be composited and displayed in an image of a television program or the like, thus displaying an advertisement which changes in real-time while avoiding CM cut. Also, since CM times need not be assured, services to the viewers can be improved.

Eighth Embodiment

The eighth embodiment converts a picture at the performer's viewpoint and that at the camera viewpoint into multi-channel data for a plurality of channels of the Internet, satellite broadcast, ground wave broadcast, and the like.

Figure 30:
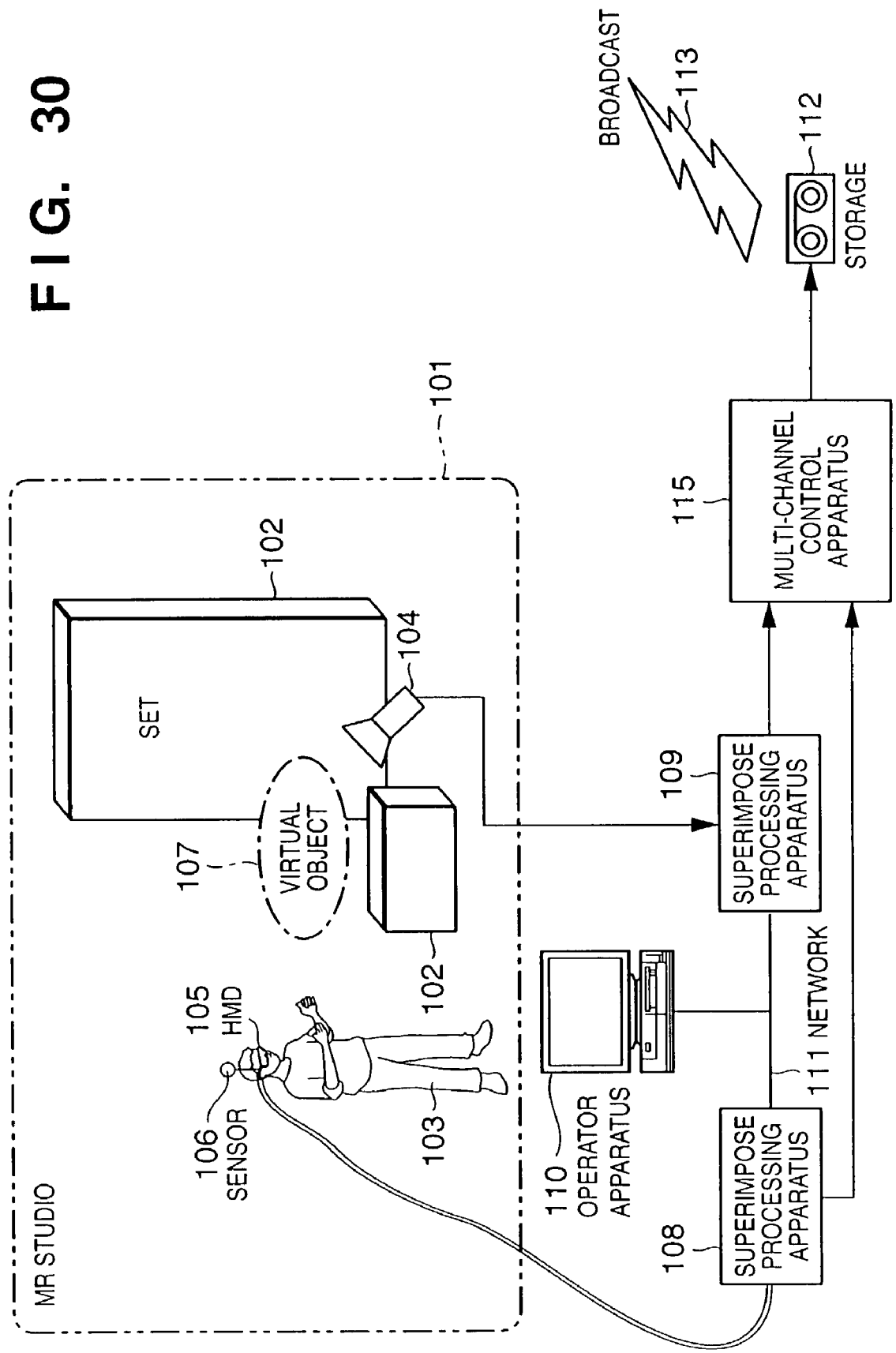
FIG. 30 is a schematic system diagram showing the arrangement of a photographing studio system to which the eighth embodiment of the present invention is applied.
Figure 31:
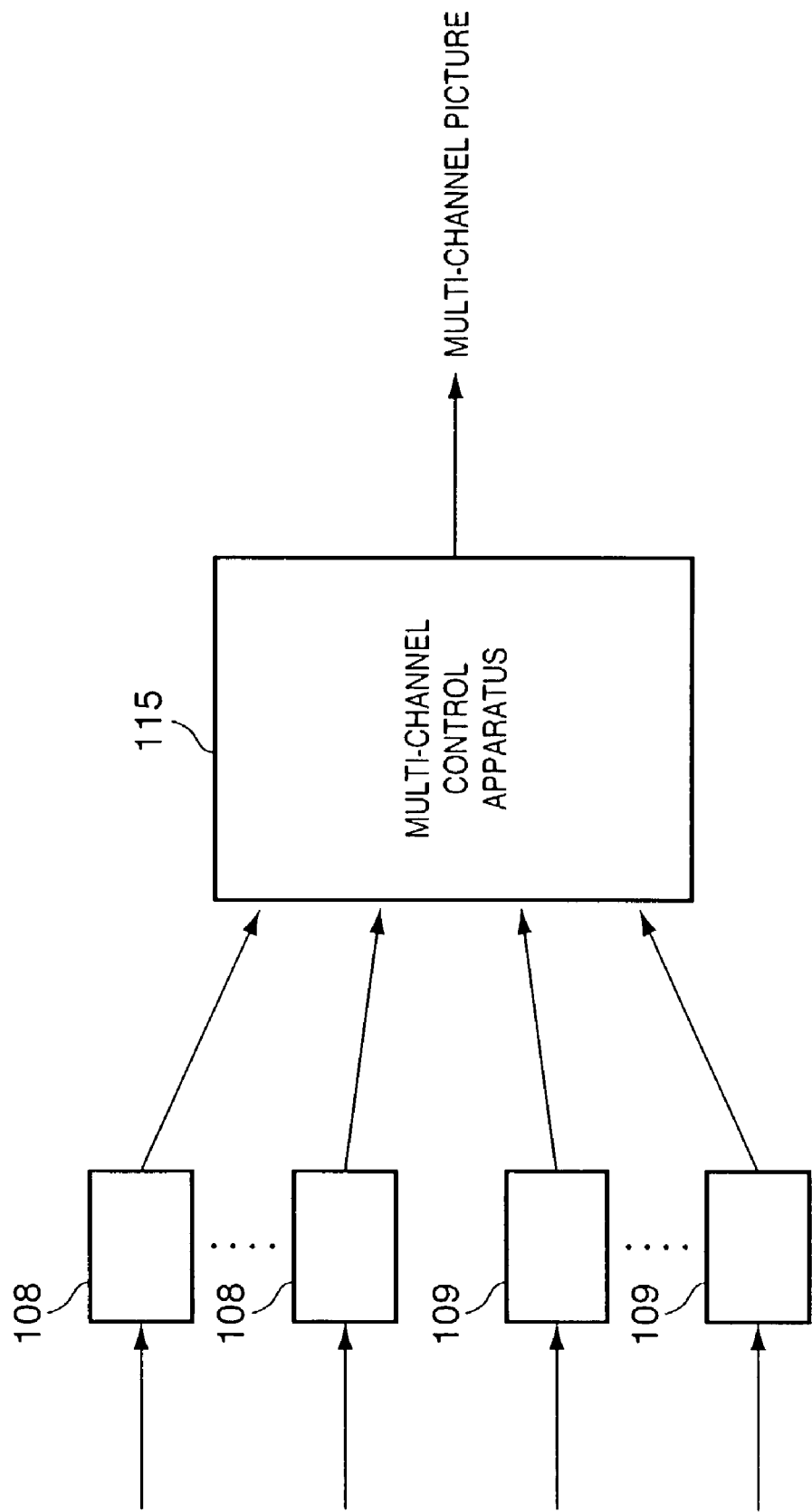
FIG. 31 is an explanatory view for explaining a characteristic feature of the eighth embodiment of the present invention.

FIG. 30 is a system diagram of a system to which the eighth embodiment is applied. In FIG. 30, a multi-channel control apparatus 115 is added to the system of the first embodiment shown in FIG. 1.

The multi-channel control apparatus 115 simultaneously receives a plurality of composite pictures in correspondence with the number of sets of the superimpose processing apparatus 108 for generating a composite picture at the performer's viewpoint, and the superimpose processing apparatus 109 for generating a composite picture at the audience viewpoint (camera viewpoint). The multi-channel control apparatus 115 selects pre-set composite pictures from the plurality of input composite pictures, and converts them into multi-channel data for a plurality of channels of the Internet, satellite broadcast, ground wave broadcast, and the like, thus outputting the multi-channel data.

Ninth Embodiment

In the eighth embodiment, pre-set composite pictures are fixedly selected. However, in this embodiment, composite pictures are flexibly selected in correspondence with a situation on the basis of information, and are converted into multi-channel data.

Figure 32:
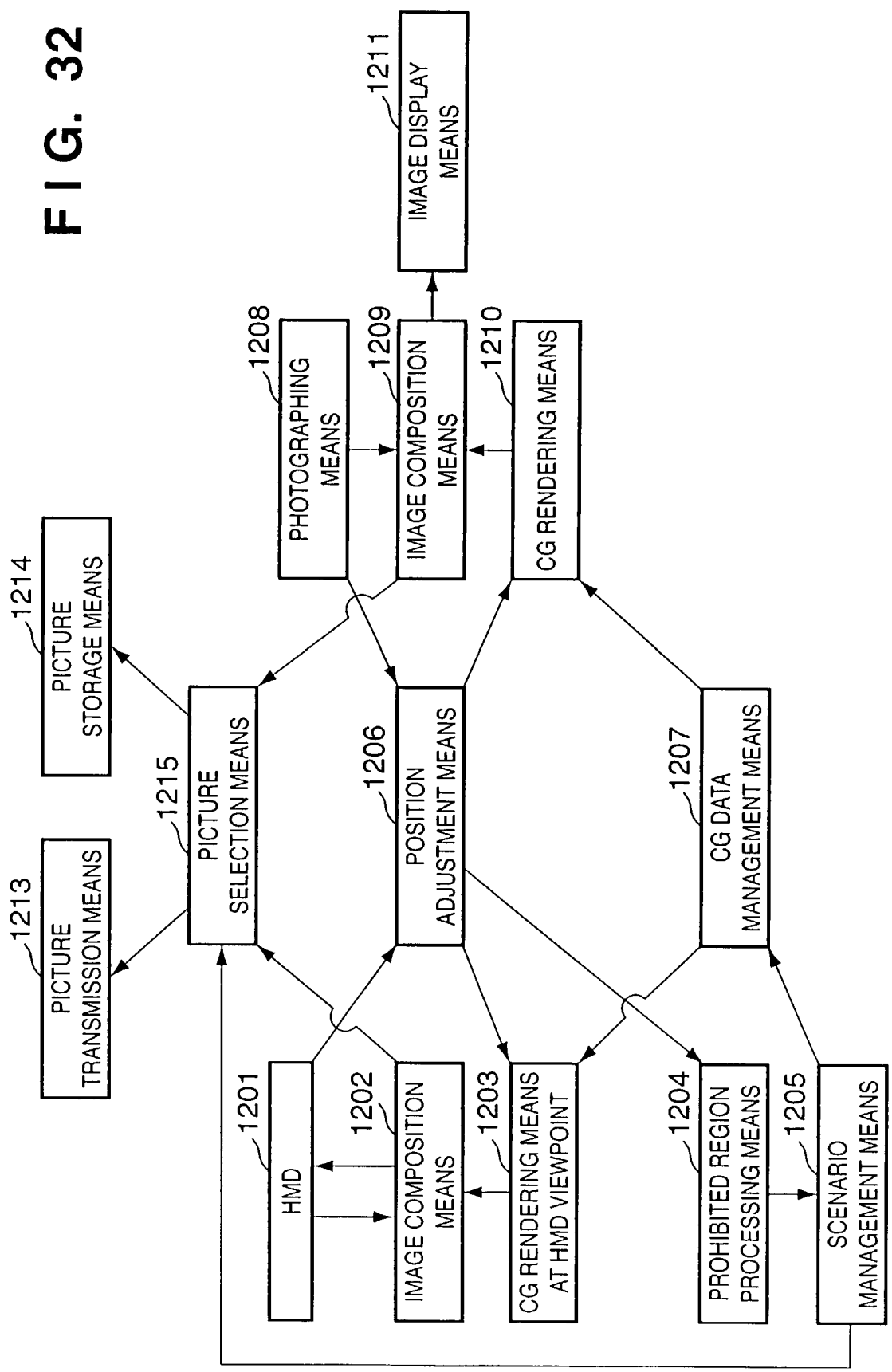
FIG. 32 is a functional block diagram showing the functions in the ninth embodiment of the present invention.
Figure 33:
FIG. 33 shows the scenario contents in the ninth embodiment of the present invention.

FIG. 32 is a functional block diagram in such case. In FIG. 32, a picture selection means 1215, picture transmission means 1213, and picture storage means 1214 are added to the functional block diagram of the first embodiment shown in FIG. 3. FIG. 33 shows an example of a scenario stored in the scenario management means 1205 shown in FIG. 32.

In the example in FIG. 33, composite pictures to be converted into multi-channel data are described in parentheses like [select camera A and player A] in a scenario. The scenario management means 1205 sends this information to the picture selection means 1215, which selects composite pictures on the basis of the information sent from the scenario management means 1205, converts the selected composite pictures into multi-channel data, and outputs that data to the picture transmission means 1213 or picture storage means 1214.

As described above, in the ninth embodiment, since composite pictures to be converted into multi-channel data are selected in accordance with information described in the scenario, a composite picture at the performer's viewpoint or that at the camera viewpoint can be flexibly selected in accordance with the progress of the scenario, and can be converted into multi-channel data to be output.

10th Embodiment

The 10th embodiment allows a viewer to select composite pictures to be converted into multi-channel data using the Internet, and is applied to the same service environment as that in the second embodiment shown in FIG. 17.

FIG. 34 is a system diagram of a system according to the 10th embodiment. In this system, a multi-channel control apparatus 115 is added to the system of the second embodiment shown in FIG. 18.

Reference numeral 104 denotes a photographing device (camera); 109, a processing apparatus for superimposing a picture of a virtual object on a camera picture; 113, a broadcast means for broadcasting a composite picture generated by the MR studio; 902, the Internet; 1901, a virtual character (monster in this case) generated by CG; 1902, an operator apparatus for controlling the system state as well as the communication result from the Internet; and 1903, a server apparatus for receiving communications from the Internet.

In case of the Internet video communication, the broadcast means 113 comprises a system, which is generally known as a streaming server, and is available from, e.g., RealNetworks. In case of satellite broadcast (communication) or ground wave broadcast, the broadcast means 113 comprises a general broadcast system in the art.

As in FIG. 1, the photographing device (camera) 104 photographs a real picture of the studio, and the photographed picture data is composited with CG, data by the superimpose processing apparatus 109. Composite picture data as the output of the apparatus 109 is broadcasted to end viewers as the Internet, or satellite broadcast or ground wave broadcast via the broadcast means 113. In the home of each end viewer, the broadcast is received using an Internet terminal that can establish connection to the Internet, or a BS digital broadcast terminal or digital TV terminal.

At the same time, such terminal can communicate with the server apparatus 1903 when it establishes connection to the Internet. The viewer can see the broadcasted picture, and can make operation such as clicking on a specific position on the screen by a general interactive method using a mouse, remote controller, or the like. This operation signal is transferred from the Internet terminal or the like to the server apparatus 1903, which counts such operation signals to collect reactions from the viewers. This counting process acquires information of click counts of regions, which are obtained by dividing the screen into some regions, by the viewers.

The count information is transferred to the operator apparatus 1902, which selects composite pictures to be converted into multi-channel data by the multi-channel control apparatus 115, in accordance with the count information. For example, when a plurality of performers appear, if the number of viewers who designated a specific performer is large, a picture is switched to a picture at the viewpoint of that performer. In this way, pictures corresponding to larger requests from the viewers are converted into multi-channel data to be broadcasted.

Pictures which are to be converted into multi-channel data according to viewers' requests are not only a picture at the performer's viewpoint but also a picture at the camera viewpoint (audience viewpoint). Also, the first to 10th embodiment can be combined as needed.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

The present invention includes a product, e.g., a printout, obtained by the image processing method of the present invention.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

As many apparently widely different embodiments of the present invention can be made without departing from the spirit and scope thereof, it is to be understood that the invention is not limited to the specific embodiments thereof except as defined in the appended claims.

As described above, according to the present invention, a high-quality composite image of a real image and virtual image can be provided to a viewer and the like. For example, a performer can act while observing a composite image of a virtual object and a real-world picture, a composite image free from any positional deviation can be obtained even when a performer, camera, virtual object, and the like, move largely and intricately, a viewer can manipulate a virtual object, an advertisement can be changeably displayed as one of virtual objects, a composite picture can be converted into multi-channel data so that it can be broadcast via various broadcast media, and so forth.

What is claimed is:

1. An image processing apparatus comprising:
a first measurement unit adapted to measure a first position/orientation of a photographing unit adapted to photograph an object;
a second measurement unit adapted to measure a second position/orientation of the object;
a prohibited region setting unit adapted to set a prohibited region in association with a layout position of the CG (Computer Graphics) data based on the second position/orientation;
a CG data generation unit adapted to generate CG data based on the first or the second position/orientation, and the prohibited region;
a first composition unit adapted to composite the CG data corresponding to the first position/orientation and image data photographed by the photographing unit;
a second composition unit adapted to composite the CG data corresponding to the second position/orientation and image data of a real image corresponding to the second position/orientation;
a selection unit adapted to select image data from image data composited by said first and second composition units; and
a multi channel control unit adapted to generate output data, corresponding to each channel of multiple channels, from the selected image data,
wherein the multiple channels include at least the Internet, a satellite broadcast, and a ground wave broadcast.

2. An image processing apparatus comprising:
a first measurement unit adapted to measure a first position/orientation of a photographing unit adapted to photograph an object;
a second measurement unit adapted to measure a second position/orientation of the object;
a prohibited region setting unit adapted to set a prohibited region in association with a layout position of the CG (Computer Graphics) data based on the second position/orientation;
a CG data generation unit adapted to generate CG data based on the first or the second position/orientation, and the prohibited region;
a selection unit adapted to select CG data from CG data generated by said CG data generation unit; and
a multi channel control unit adapted to generate output data, corresponding to each channel of multiple channels, from the selected CG data,
wherein the multiple channels include at least the Internet, a satellite broadcast, and a ground wave broadcast.

3. The apparatus according to claim 1, further comprising a Head Mount Display for displaying a second composited image formed by said second composition unit.

4. The apparatus according to claim 1, further comprising a scenario management unit adapted to manage a scenario and wherein the CG data generation unit generates the CG data on the basis of the managed scenario.

5. An image processing apparatus comprising:
a first measurement unit adapted to measure a first position/orientation of a photographing unit adapted to photograph an object;
a second measurement unit adapted to measure a second position/orientation of the object;
a prohibited region setting unit adapted to set a prohibited region in association with a layout position of the CG (Computer Graphics) data based on the second position/orientation;
a scenario management unit adapted to manage a scenario;
a CG data generation unit adapted to generate CG data based on the first or the second position/orientation, and the prohibited region;
a first composition unit adapted to composite the CG data corresponding to the first position/orientation and the image data photographed by the photographing unit;

a second composition unit adapted to composite the CG data corresponding to the second position/orientation and the image data of a real image corresponding to the second position/orientation;
a server unit adapted to receive a request from a viewer; and
an operator unit adapted to reflect the request from the viewer received by said server unit in the scenario managed by said scenario management unit.

6. The apparatus according to claim 5, wherein the request from the viewer is assigned to a plurality of CG data or a predetermined building component of sole CG data for each viewer.

7. The apparatus according to claim 5, wherein said server unit comprises a limitation unit adapted to limit a viewer from which a request is received.

8. The apparatus according to claim 1, further comprising an introduction unit adapted to externally introduce the CG data.

9. The apparatus according to claim 1, wherein CG data associated with an advertisement is included as one of the CG data.

10. The apparatus according to claim 9, further comprising a change unit adapted to change the CG data associated with the advertisement.

11. The apparatus according to claim 1, wherein said selection unit selects pre-set image data from image data composited by said first and second composition units.

12. The apparatus according to claim 1, wherein said selection unit selects image data to be converted into the multi-channel data on the basis of information described in a scenario.

13. The apparatus according to claim 1, wherein said selection unit selects image data to be converted into the multi-channel data in accordance with a request from a viewer.

14. A computer-implemented image processing method comprising the steps of:
measuring a first position/orientation of a photographing unit adapted to photograph an object;
measuring a second position/orientation of the object;
setting a prohibited region in association with a layout position of the CG (Computer Graphics) data based on the second position/orientation;
generating CG data based on the first or the second position/orientation, and the prohibited region;
compositing the CG data corresponding to the first position/orientation and image data photographed by the photographing unit;
compositing the CG data corresponding to the second position/orientation and image data of a real image corresponding to the second position/orientation;
selecting image data from image data composited by said first position/orientation compositing step and said second position/orientation compositing step; and
generating output data, corresponding to each channel of multiple channels, from the selected image data,
wherein the multiple channels include at least the Internet, a satellite broadcast, and a ground wave broadcast.

15. A control program tangibly embodied on a computer-readable medium for making a computer perform a method comprising the steps of:
measuring a first position/orientation of a photographing unit adapted to photograph an object;
measuring a second position/orientation of the object;
setting a prohibited region in association with a layout position of the CG (Computer Graphics) data based on the second position/orientation;
generating CG data based on the first or the second position/orientation, and the prohibited region;
compositing the CG data corresponding to the first position/orientation and image data photographed by the photographing unit;
compositing the CG data corresponding to the second position/orientation and image data of a real image corresponding to the second position/orientation;
selecting image data from image data composited by said first position/orientation compositing step and said second position/orientation compositing step; and
generating output data, corresponding to each channel of multiple channels, from the selected image data,
wherein the multiple channels include at least the Internet, a satellite broadcast, and a ground wave broadcast.

16. A computer-implemented image processing method comprising the steps of:
measuring a first position/orientation of a photographing unit adapted to photograph an object;
measuring a second position/orientation of the object;
setting a prohibited region in association with a layout position of the CG (Computer Graphics) data based on the second position/orientation;
managing a scenario;
generating CG data based on the first or the second position/orientation, and the prohibited region;
compositing the CG data corresponding to the first position/orientation and the image data photographed by the photographing unit;
compositing the CG data corresponding to the second position/orientation and the image data of a real image corresponding to the second position/orientation;
receiving a request from a viewer; and
operating to reflect the request from the viewer received in said receiving step in the scenario managed in said managing step.

17. A control program tangibly embodied on a computer-readable medium for making a computer perform a method comprising the steps of:
measuring a first position/orientation of a photographing unit adapted to photograph an object;
measuring a second position/orientation of the object;
setting a prohibited region in association with a layout position of the CG (Computer Graphics) data based on the second position/orientation;
managing a scenario;
generating CG data based on the first or the second position/orientation, and the prohibited region;
compositing the CG data corresponding to the first position/orientation and the image data photographed by the photographing unit;
compositing the CG data corresponding to the second position/orientation and the image data of a real image corresponding to the second position/orientation;
receiving a request from a viewer; and
operating to reflect the request from the viewer received in said receiving step in the scenario managed in said managing step.

* * * * *